US008753997B2

(12) United States Patent
Stanis et al.

(10) Patent No.: US 8,753,997 B2
(45) Date of Patent: Jun. 17, 2014

(54) IMMOBILIZED HETEROPOLY ACIDS AND THE USE OF THE SAME FOR ELECTRODE STABILIZATION AND ENHANCEMENT

(75) Inventors: Ronald Justin Stanis, Albuquerque, NM (US); Andrew Michael Herring, Nederland, CO (US); Mei-Chen Kuo, Denver, CO (US); Jack Richard Ferrell, III, Golden, CO (US)

(73) Assignee: Colorado School of Mines, Golden, CO (US)

( * ) Notice: Subject to any disclaimer, the term of this patent is extended or adjusted under 35 U.S.C. 154(b) by 1540 days.

(21) Appl. No.: 12/122,529

(22) Filed: May 16, 2008

(65) Prior Publication Data
US 2008/0299433 A1    Dec. 4, 2008

Related U.S. Application Data

(60) Provisional application No. 60/938,764, filed on May 18, 2007.

(51) Int. Cl.
*B01J 21/00* (2006.01)
*C07C 319/00* (2006.01)
*C07C 43/30* (2006.01)

(52) U.S. Cl.
USPC .............................. 502/160; 568/45; 568/600

(58) Field of Classification Search
None
See application file for complete search history.

(56) References Cited

U.S. PATENT DOCUMENTS

| | | | | |
|---|---|---|---|---|
| 5,501,922 A | * | 3/1996 | Li et al. | 429/212 |
| 6,005,148 A | * | 12/1999 | Tanielyan et al. | 568/454 |
| 6,706,833 B1 | * | 3/2004 | Maatta et al. | 526/240 |
| 7,892,700 B2 | * | 2/2011 | Lee | 429/524 |
| 2003/0027052 A1 | * | 2/2003 | Huang et al. | 429/304 |
| 2006/0151399 A1 | * | 7/2006 | Brandts et al. | 210/723 |
| 2007/0264551 A1 | * | 11/2007 | Matsunaga | 429/29 |

OTHER PUBLICATIONS

Li, et al. "Preparation, Characterization and Photocatalytic applications of amine-functionalize mesoporous silica impregnated with transition metal monosubstituted polyoxometalates". Materials Research Bulletin. 319-332, 41 (2006).*
Allongue, P., M. Delamar, B. Desbat, O. Fagebaume, R. Hitmi, J. Pinson and J. M. Saveant "Covalent Modification of Carbon Surfaces by Aryl Radicals Generated from the Electrochemical Reduction of Diazonium Salts." Jounal of the American Chemical Society (1997) 119(1): 201-207.

(Continued)

*Primary Examiner* — Melvin C Mayes
*Assistant Examiner* — Sheng H Davis
(74) *Attorney, Agent, or Firm* — Sheridan Ross PC

(57) ABSTRACT

The use of fuel cells to produce electricity are known as an environmentally clean and reliable source of energy, and show promise as an automotive power source if the polymer electrolyte membrane fuel cell can be made less expensive, more durable, reduce or eliminate humidification of the reactive gases, and operate at temperatures encountered during automotive operating conditions. The use of an electro-catalyst formed from heteropoly acids immobilized by a conductive material, such as carbon or platinum black, and stabilizing a metallic black with the immobilized conductive material addressed these automotive fuel cell needs. Coating the fuel cell electrode, polymer electrolyte assembly with a nanoparticle catalyst derived from a heteropoly acid provided anodic carbon monoxide tolerance at anodic overpotentials and an active cathodic oxygen reduction. The heteropoly acids can also function as supercapacitor electrode films.

23 Claims, 6 Drawing Sheets

(56) References Cited

OTHER PUBLICATIONS

Arbizzani, C., M. Mastragostino and F. Soavi "New trends in electrochemical supercapacitors." *Journal of Power Sources* (2001) 100(1-2): 164-170.

Arbizzani, C., M. Mastragostino and L. Meneghello "Polymer-based redox supercapacitors: A comparative study." *Electrochimica Acta* (1996) 41(1): 21-26.

Baffert, C., J. F. Boas, A. M. Bond, P. Kogerler, D. L. Long, J. R. Pilbrow and L. Cronin "Experimental and theoretical investigations of the sulfite-based polyoxometalate cluster redox series: alpha- and beta-[Mo18O54(SO3)(2)](4-15-16-)." *Chemistry-a European Journal* (2006) 12(33): 8472-8483.

Baffert, C., S. W. Feldberg, A. M. Bond, D. L. Long and L. Cronin "pH-Dependence of the aqueous electrochemistry of the two-electron reduced alpha-[Mo18O54(SO3)] sulfite Dawson-like polyoxometalate anion derived from its triethanolammonium salt." *Dalton Transactions* (2007) (40): 4599-4607.

Baker, S. E., K. Y. Tse, E. Hindin, B. M. Nichols, T. L. Clare and R. J. Hamers "Covalent functionalization for biomolecular recognition on vertically aligned carbon nanofibers." *Chemistry of Materials* (2005) 17(20): 4971-4978.

Bregeault, J.-M., M. Vennat, S. Laurent, J.-Y. Piquemal, Y. Mahha, E. Briot, P. C. Bakala, A. Atlamsani and R. Thouvenot "From polyoxometalates to polyoxoperoxometalates and back again; potential applications." *Journal of Molecular Catalysis A: Chemical* (2006) 250(1-2): 177-189.

Bruno, F., M. C. Pham and J. E. Dubois "Polaromicrotribometric Study of Polyphenylene Oxide Film Formation on Metal-Electrodes by Electrolysis of Disubstituted Phenols." *Electrochimica Acta* (1977) 22(4): 451-457.

Burke, A. "Ultracapacitors: why, how, and where is the technology." *Journal of Power Sources* (2000) 91(1): 37-50.

Chen, S. and A. Kucernak "Electrocatalysis under conditions of high mass-transport: Oxygen reduction on single submicron Pt particles supported on carbon." *J. Phys. Chem. B* (2004) 108: 3262-3276.

Chen, S. and A. Kucernak "Electrocatalysis under conditions of high mass-transport: Investigation of hydrogen oxidation on single submicron Pt particles supported on carbon." *J. Phys. Chem. B* (2004) 108(37): 13984-13994.

Chen, S. and A. Kucernak "Electrodeposition of Platinum on Nanometer-Sized Carbon Electrodes." *J. Phys. Chem. B*, (2003) 107: 8392-8402.

Chen, S. and A. Kucernak "The voltammetric response of nanometre-sized carbon electrodes." *J. Phys. Chem. B.* (2002) 106: 9396-9404.

Conway, B. E. and W. G. Pell "Double-layer and pseudocapacitance types of electrochemical capacitors and their applications to the development of hybrid devices." *Journal of Solid State Electrochemistry* (2003) 7(9): 637-644.

Conway, B. E. "Transition from Supercapacitor to Battery Behavior in Electrochemical Energy-Storage." *Journal of the Electrochemical Society* (1991) 138(6): 1539-1548.

Cottineau, T., M. Toupin, T. Delahaye, T. Brousse and D. Belanger "Nanostructured transition metal oxides for aqueous hybrid electrochemical supercapacitors." *Applied Physics a—Materials Science & Processing* (2006) 82(4): 599-606.

Cuentas-Gallegos, A. K., M. Lira-Cantu, N. Casan-Pastor and P. Gomez-Romero "Nanocomposite hybrid molecular materials for application in solid-state electrochemical supercapacitors." *Advanced Functional Materials* (2005) 15(7): 1125-1133.

Dec, S. F. and A. M. Herring "Structure and Dynamics of Disodium Hydrogen 12-Tungstophosphoric Acid." *J. Phys. Chem. B* (2004) 108(33): 12339-12351.

Dec, S. F., G. M. Jacobsen, J. L. Horan and A. M. Herring "NMR Study of Proton Sites in Group I Salts of 12-Tungstophosphoric Acid." *J. Phys. Chem. C* (2007) 111(21): 7720-7726.

Djian, D., F. Alloin, S. Martinet, H. Lignier and J. Y. Sanchez "Lithium-ion batteries with high charge rate capacity: Influence of the porous separator." *Journal of Power Sources* (2007) 172(1): 416-421.

Fay, N., A. M. Bond, C. Baffert, J. F. Boas, J. R. Pilbrow, D. L. Long and L. Cronin "Structural, electrochemical, and spectroscopic characterization of a redox pair of sulfite-based polyoxotungstates: alpha-[W18O54(SO3)(2)](4-) and alpha-[W18O54(SO3)(2)](5-)." *Inorganic Chemistry* (2007) 46(9): 3502-3510.

Frackowiak, E. and F. Beguin "Carbon materials for the electrochemical storage of energy in capacitors." *Carbon* (2001) 39(6): 937-950.

Frackowiak, E. and F. Beguin "Electrochemical storage of energy in carbon nanotubes and nanostructured carbons." *Carbon* (2002) 40(10): 1775-1787.

Frackowiak, E., V. Khomenko, K. Jurewicz, K. Lota and F. Beguin "Supercapacitors based on conducting polymers/nanotubes composites." *Journal of Power Sources* (2006) 153(2): 413-418.

Fujikawa, D., M. Uota, G. Sakai and T. Kijma "Shape-controlled synthesis of nanocarbons from resorcinol-formaldehyde nanopolymers using surfactant-templated vesicular assemblies." *Carbon* (2007) 45(6): 1289-1295.

Fukunaga, H., M. Kishimi, T. Ozaki and T. Sakai "Non-foam nickel electrode with quasi-three-dimensional substrate for Ni-MH battery." *Journal of the Electrochemical Society* (2005) 152(1): A126-A131.

Gostovic, D., J. R. Smith, D. P. Kundinger, K. S. Jones and E. D. Wachsman "Three-dimensional reconstruction of porous LSCF cathodes." *Electrochemical and Solid State Letters* (2007) 10(12): B214-B217.

Griesser, S., G. Buchinger, T. Raab, D. P. Claassen and D. Meissner "Characterization of fuel cells and fuel cell systems using three-dimensional X-ray tomography." *Journal of Fuel Cell Science and Technology* (2007) 4(1): 84-87.

Haugen, G. M., F. Meng, M. H. Frey, S. J. Hamrock, N. Aieta, J. Horan, M. C. Kuo and A. M. Herring "Reduction in Fluoride ion decay by catalytic mitigation of peroxide by a series of heteropoly acids." *Electrochemical and Solid State Letters* (2007) 10(3): B51. Title Prob.

Herring, A. M., J. T. McKinnon, B. D. McCloskey, J. Filley, K. W. Gneshin, R. A. Pavelka, H. J. Kleebe and D. J. Aldrich "A Novel Method for the Templated Synthesis of Homogeneous Samples of Hollow Carbon Nanospheres from Cellulose Chars." *J. Am. Chem. Soc.* (2003) 125(33): 9916-9917.

Herring, A. M., R. J. Stanis, M.-C. Kuo and J. A. Turner "The Use of Heteropoly Acids as Supports for Low, Ultra-Stable Pt Electrocatalysts." *Electrochemical Society Transactions* (2007) 11: 337.

Herring, A. M., R. L. McCormick and S. R. Boonrueng "A Comparison of the Interaction of Nitric Oxide with the Heteropolytungstic Acids H3PW12O40, H0.5Cs2.5PW12O40, HMgPW12O40, H8SiW11O38, H4SiW12O40, and H10CoW12O42." *J. Phys. Chem. B* (2000) 104(19): 4653-4660.

Horan, J. L., N. V. Aieta, J. E. Leisch, M.-C. Kuo, S. F. Dec and A. M. Herring "Advances in Hybrid Organic-Inorganic Proton Exchange Polymer Membranes Incorporating Heteropoly Acids." *Electrochemical Society Transactions* (2007) 11: 97.

Jiang, J. and A. Kucernak "Electrochemical supercapacitor material based on manganese oxide: preparation and characterisation." *Electrochimica Acta.* (2002) 47: 2381-2386.

Judeinstein, P. "Synthesis and Properties of Polyoxometalates Based Inorganic-Organic Polymers." *Chemistry of Materials* (1992) 4(1): 4-7.

Kang, Z. H., Y. B. Wang, E. B. Wang, S. Y. Lian, L. Gao, W. S. You, C. W. Hu and L. Xu "Polyoxometalates nanoparticles: synthesis, characterization and carbon nanotube modification." *Solid State Communications* (2004) 129(9): 559-564.

Kuo, M.-C., R. J. Stanis, J. R. Ferrell III, J. A. Turner and A. M. Herring "Electrocatalyst materials for fuel cells based on the polyoxometalates—K7 or H7[(P2W17O61)FeIII(H2O)] and Na12 or H12[(P2W15O56)2FeIII4(H2O)2]." *Electrochimica Acta* (2007) 52: 2051.

Laforgue, A., P. Simon, J. F. Fauvarque, M. Mastragostino, F. Soavi, J. F. Sarrau, P. Lailler, M. Conte, E. Rossi and S. Saguatti "Activated carbon/conducting polymer hybrid supercapacitors." *Journal of the Electrochemical Society* (2003) 150(5): A645-A651.

(56) References Cited

OTHER PUBLICATIONS

Lee, H. Y. and J. B. Goodenough "Ideal supercapacitor behavior of amorphous V2O5 center dot nH(2)O in potassium chloride (KCI) aqueous solution." *Journal of Solid State Chemistry* (1999) 148(1): 81-84.

Lee, J. Y., K. Liang, K. H. An and Y. H. Lee "Nickel oxide/carbon nanotubes nanocomposite for electrochemical capacitance." *Synthetic Metals* (2005) 150(2): 153-157.

Lewandowski, A. and M. Galinski "Practical and theoretical limits for electrochemical double-layer capacitors." *Journal of Power Sources* (2007) 173(2): 822-828.

Li, C., D. Wang, X. Wang and J. Liang "Controlled electrochemical oxidation for enhancing the capacitance of carbon nanotube composites." *Carbon* (2005) 43(7): 1557-1560.

Li, H. Q., R. L. Liu, D. Y. Zhao and Y. Y. Xia "Electrochemical properties of an ordered mesoporous carbon prepared by direct tri-constituent co-assembly." *Carbon* (2007) 45(13): 2628-2635.

Long, D. L., P. Kogerler and L. Cronin "Old clusters with new tricks: Engineering S center dot center dot center dot S interactions and novel physical properties in sulfite-based dawson clusters." *Angewandte Chemie-International Edition* (2004) 43(14): 1817-1820.

Ma, R. Z., J. Liang, B. Q. Wei, B. Zhang, C. L. Xu and D. H. Wu "Study of electrochemical capacitors utilizing carbon nanotube electrodes." *Journal of Power Sources* (1999) 84(1): 126-129.

Malers, J. L., M.-A. Sweikart, J. L. Horan, J. A. Turner and A. M. Herring "Studies of heteropoly acid/polyvinylidenedifluoride-hexafluoroproylene composite membranes and implication for the use of heteropoly acids as the proton conducting component in a fuel cell membrane." *Journal of Power Sources* (2007) 172(1): 83-88.

Moore, A. R., H. Kwen, A. M. Beatty and E. A. Maatta "Organoimido-polyoxometalates as polymer pendants." *Chemical Communications* (2000) (18): 1793-1794.

Niu, C. M., E. K. Sichel, R. Hoch, D. Moy and H. Tennent "High power electrochemical capacitors based on carbon nanotube electrodes." *Applied Physics Letters* (1997) 70(11): 1480-1482.

Palencsar, A. and D. A. Scherson "Electrochemical and in situ optical characterization of single micrometer-size particles of spherical nickel oxide in alkaline aqueous electrolytes." *Electrochemical and Solid State Letters* (2003) 6(4): E1-E4.

Pham, M. C., P. C. Lacaze and J. E. Dubois "Obtaining Thin-Films of Reactive Polymers on Metal-Surfaces by Electrochemical Polymerization .1. Reactivity of Functional-Groups in a Carbonyl Substituted Polyphenylene Oxide Film." *Journal of Electroanalytical Chemistry* (1978) 86(1): 147-157.

Plitz, I., A. DuPasquier, F. Badway, J. Gural, N. Pereira, A. Gmitter and G. G. Amatucci "The design of alternative nonaqueous high power chemistries." *Applied Physics a—Materials Science & Processing* (2006) 82(4): 615-626.

Portet, C., P. L. Taberna, P. Simon, E. Flahaut and C. Laberty-Robert "High power density electrodes for carbon supercapacitor applications." *Electrochimica Acta* (2005) 50(20): 4174-4181.

Rhodes, C. P., J. W. Long and D. R. Rolison "Direct electrodeposition of nanoscale solid polymer electrolytes via electropolymerization of sulfonated phenols." *Electrochemical and Solid State Letters* (2005) 8(11): A579-A584.

Rong, C. and F. C. Anson "Spontaneous adsorption of heteropolytungstates and heteropolymolybdates on the surfaces of solid electrodes and the electrocatalytic activity of the adsorbed anions,." *Inorganica Chimica Acta* (1996) 242(1-2): 11-16.

Rudge, A., J. Davey, I. Raistrick, S. Gottesfeld and J. P. Ferraris "Conducting Polymers as Active Materials in Electrochemical Capacitors." *Journal of Power Sources* (1994) 47(1-2): 89-107.

Chen, Shengli "Fabrication of Carbon Microelectrodes with an Effective Radius of 1 nm." *Electrochemistry Communications* 4 (2002) 80-85.

Cuentas-Gallegos, Ana K. "Electrochemical Supercapacitors Based on Novel Hybrid Materials Made of Carbon Nanotubes and Polyoxometalates." *Electrochemistry Communications* 9 (2007) 2008-2092.

Gomez-Romero, Pedro "Hybrid Organic-Inorgainic Nanocomposite Materials for Application in Solid State Electrochemical Supercapacitors." *Electrochemistry Communications* 5 (2003) 149-153.

McCormick, Robert L. "In Situ IR and Temperture Programmed Desorption-mass Spectrometry Study of NO Absorption and Decomposition by Silica Supported 12-tungstophsphoric Acid." *Catalysis Today* 42 (1998) 145-157.

Sadakane, Masahiro "Electrochemical Properties of Polyoxometalates as Electrocatalysts." *Chem. Rev.* 1998, 98, 219-237.

Stanis, Ronald J. "Use of W, Mo, and V Substitured Heteropolyacids for CO Mitigation in PEMVCs." *Journal of Electrochemical Society*, 155 (2) B155-B162 (2008).

Strong, Joseph B. A New Class of Functionalized Polyoxometalates: Synthetic, Structural, Spectroscopic, and Electrochemical Studies of Organoimido Derivatives of $[Mo_6O_{19}]^{2-}$. *J. Am. Chem. Soc.* 2000, 122, 639-649.

Sun, Bin "Covalent Photochemical Functionalization of Amorphous Carbon Thin Films for Integrated Real-Time Biosensing." *Langmuir* 2006, 9598-9605.

Vaillant, Julien "Chemical Synthesis of Hybrid Materials Based on PAni and PEDOT with Polyoxometalates for Electrochemical Supercapacitors." *Progress in Solid State Chemistry* 34 (2006) 147-159.

Vivier, V. "Electrochemical Study of $LaNi_{3.55}Mn_{04}Al_{0.3}CO_{0.75}$ by Cavity Microelectrode in 7 mol $l^{-1}$ KOH Solution" *Journal of Power Sources* 124 (2003) 564-571.

Wang, Xiao-Feng "A Hybrid Metal Oxide Supercapacitor in Aqueous KOH Electrolyte" *Chinese Journal of Chemistry* 2006, 24, 1126-1132.

Weeks, Mark "Synthesis, Characterization, and Anti-Human Immunodeficiency Virus Activity of Water-Soluble Salts of Polyoxotungstate Anions with Covalently Attached Organic Groups" *J.Med. Chem.* 1992, 35, 1216-1221.

Wilson, James R. "Three-Dimensional Reconstruction of a Solid-Oxide Fuel-Cell Anode" *Nature Materials*, vol. 5, Jul. 2006.

Zhang, Sheng Shui "A Review of the Separators of Liquid Electrolyte Li-ion Batteries" *Journal of Power Sources*, 164 (2007) 351-364.

Zheng, J. P. "Resistance Distribution in Electrochemical Capacitors with Spiral-Wound Structure" *Journal of Power Sources* 156 (2006) 748-754.

Zheng, Jim P. "Resistance Distribution in Electrochemical Capacitors with a Bipolar Structure" *Journal of Power Sources* 137 (2004) 158-162.

Zheng, Jim P. "The Limitations of Energy Density of Battery/Double Layer Capacitor Asymmetric Cells" *Journal of the Electrochemical Society* 150 (4) A484-A492 (2003).

* cited by examiner

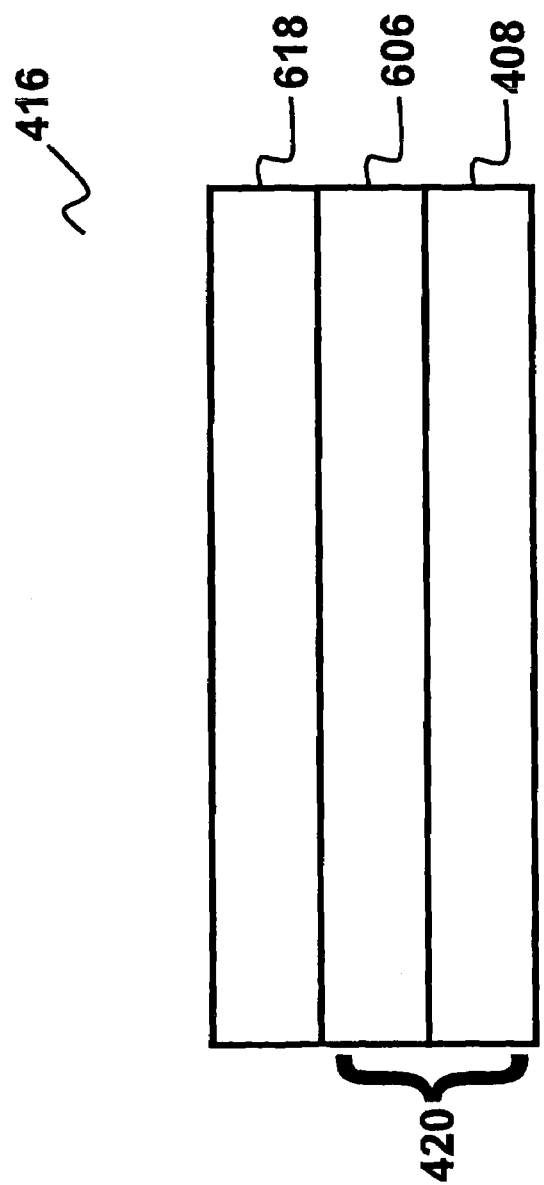

IMMOBILIZED HETEROPOLY ACIDS AND THE USE OF THE SAME FOR ELECTRODE STABILIZATION AND ENHANCEMENT

CROSS REFERENCE TO RELATED APPLICATION

The present application claims the benefits of U.S. Provisional Patent Application Ser. No. 60/938,764, filed May 18, 2007, to Stanis et al., which is incorporated herein by this reference.

FIELD OF THE INVENTION

The present invention relates generally to immobilized heteropoly acids and polyoxometalates, specifically to a method of preparing and using immobilized heteropoly acids and polyoxometalates to stabilize and enhance fuel cell and supercapacitor electrodes.

BACKGROUND OF THE INVENTION

Heteropoly acids are a class of acids generally characterized by a combination of hydrogen and oxygen with certain metals and non-metals. Heteropoly acids and their conjugate polyoxometalate anions are commonly known for their strong Brønsted acid character, oxidative capacity, catalytic activity, and conductivity. The chemical diversity of the heteropoly acids and their conjugate polyoxometalate anions allow for a wide variation in chemical and physical properties. The chemical and physical properties of heteropoly acids and their conjugates are well suited for fuel cell and supercapacitor electrode applications.

The use of fuel cells to produce electrical energy has been known since the nineteenth century. However, commercial use of fuel cells as a source of power was eclipsed by inexpensive, readily available fossil fuels. The use of fuel cells as a power source was renewed when a clean, reliable, and compact source of electrical energy was needed for satellites and spacecraft. Fuel cells are being considered again as an energy source as the global community faces diminishing fossil fuel reserves and environmental concerns related to their use. Fuel cells typically generate power more efficient and cleaner than fossil fuel combustion.

Fuel cell technology is diverse and varied encompassing, but not limited to: boron hydride, protonic ceramic, solid state, molten carbonate, metal hydride, polymer electrolyte membrane, proton exchange membrane, and solid oxide fuel cells. Polymer electrolyte membrane hydrogen fuel cells utilize carbon supported platinum catalysts which suffer from: poor long term durability, due to the platinum being an inefficient catalyst that produces hydroxyl and peroxyl radicals that decompose the polymeric electrolyte membrane; the dissolution of platinum at high fuel cell electrode potentials; high activation over-potentials; high cost, due to required platinum loading levels; and poor carbon monoxide tolerance which hinders fuel cell performance. The major pathway for membrane decomposition arises from dissolved platinum particles that deposit within the membrane that function as a catalyst for the generation of peroxyl and hydroxyl radicals.

FIG. 1 depicts a single cell 101 of a typical polymer electrolyte membrane hydrogen fuel cell. The typical fuel cell comprises one or more cells 101 "stacked" or layered. Generally, the greater the number of layers, the greater the electrical power generated by the fuel cell.

Fuel cells and batteries are similar; both produce electrical power by electrochemical means: the fuel cell produces power continuously as long as reactants are supplied. While, the battery produces power for a finite period of time determined by the quantity and type of reactants contained within the battery.

Hydrogen 139, supplied as molecular hydrogen $H_2$ gas, enters cell 101 between anode 115 and anodic bipolar plate 131. At the anode 115 the hydrogen 139 is oxidized, the products of that half-cell oxidization are electrons 147 and protons 107. Within a complete (i.e., closed) electrical circuit, the electrons 147 flow to a power draining source 155 and the hydrogen protons 107 migrate through a proton conductor electrolyte 103 to cathode 119, where the protons 107 react with oxygen 127. Within a polymer electrolyte membrane fuel cell the electrolyte 103 comprises a polymeric electrolyte membrane. Typically, the polymeric electrolyte membrane has a noble metal catalyst (commonly, platinum) to assist in the electrochemical half-cell reactions at least one of the anode 115 or cathode 119. A gaseous mixture containing the oxygen 127 enters the cell 101 between the cathode 119 and cathodic bipolar plate 135. The protons 107, oxygen 127 and electrons 147 are components of the reductive cathodic half-cell reaction which forms water 161 and heat 165.

A capacitor is another device which functions like a battery. While both the battery and capacitor provide energy by discharging electric charges, the battery stores the electrical energy as chemical energy and the capacitor stores the electrical energy directly as electrical charges. The common components of a typical capacitor 200 are depicted in FIG. 2. The typical capacitor 200 comprises first 201 and second 202 conductors separated by a gap 203. The first 201 and second 202 conductors can be substantially similar or differ, typically they are substantially similar. The gap 203 can comprise a void or dielectric. Examples of suitable dielectrics are paper, plastic, mica, ceramic, electrolyte, and glass.

A supercapacitor, also known as an ultracapacitor or electrochemical double layer capacitor, is capable of storing large quantities of electrical charges. The typical capacitor stores about a microfarad of charge (that is, $10^{-6}$ farads), while the supercapacitor stores up to about 1,000 farad (that is, $10^3$ farads) or more. The supercapacitor has commercial applications for replacing batteries due to their quick charging and discharging capacities, temperature stability, and excellent safety and environmental characteristics.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The process and methods disclosed within the subject invention address these limitations.

SUMMARY OF THE INVENTION

These and other needs are addressed by the various embodiments and configurations of the present invention. In one aspect, the present invention is directed to heteropoly acids and polyoxometalate anions thereof. The heteropoly acids and polyoxometalate anions comprise a plurality of oxygens, one or more addenda-elements, one or more hetero-elements, and optionally one or more hydrogens. Preferably, the addenda-element comprises a transition metal and the hetero-element comprises an element belonging to an IUPAC group 13, 14, 15, or 16. More preferably, the addenda-element is one of vanadium, tantalum, molybdenum, or tungsten, and the hetero-element is one of phosphorous or silicon. In one preferred embodiment, the addenda-element has an ionic radius ranging from about 0.4 Angstroms to about 0.9 Angstroms and/or an ionic charge ranging from about +2 to about +8. In yet another preferred embodiment, the addenda-element has substantially a $d^0$ or $d^1$ electronic configuration. In an embodiment of the present invention, the polyoxometalate anion substantially comprises one of a Keggin, Dawson, or Lacunary structures.

Another aspect of the invention is a functionalized polyoxometalate. In one embodiment, the functionalized polyoxometalate comprises a polyoxometalate anion chemically bonded to a functional entity. The functional entity generally comprises a first reactive entity, a linking radical, and a second reactive entity, wherein the first and second reactive entities can be the same or differ. The linking radical is an organic entity, typically alkyl and/or aryl radicals. The functional entity comprises one of a silicon-, phosphorous-, tin-, germanium-, titanium-, or zinc-containing entity. The first reactive entity and the polyoxometalate are capable of reacting and forming a chemical bond between the functional entity and polyoxometalate. In one embodiment, the chemical bond between the functional entity and polyoxometalate generally comprises at least one of —O—Si—, —O—P—, —O—Sn—, —O—Ti—, —O—Ge—, or —O—Zn—.

Yet another aspect of the present invention is an immobilized polyoxometalate comprising functionalized polyoxometalate chemically bonded to a support substance. The support substance generally comprises carbon black, platinum black, metallic black, platinum alloy black, or mixtures thereof. In one embodiment, the support substance and second reactive entity of the functional entity are capable of reacting and forming a chemical bond between the support substance and functional entity. The chemical bond between the support substance and the functional entity can be one of: —CH$_2$—, —CHR$^1$—, —CR$^1$R$^2$—, —S—, —NH—, —NR$^1$—, —N=N—, —CH$_2$CH$_2$—, —C(=O)O—, or —O—, wherein R$^1$ and/or R$^2$ are alkyl or aryl groups, and wherein R$^1$ and R$^2$ can be the same or differ. One embodiment of present invention is a supercapacitor having one or more capacitor plates comprising an immobilized polyoxometalate.

Still yet another aspect of the present invention is an electro-catalyst comprising an immobilized polyoxometalate, a catalyst support substance, and an electrolyte membrane. The catalyst support substance generally comprises a metallic black, wherein the metallic black generally comprises one of a platinum black, carbon black, reduced platinum salt, or platinum alloy black. The electrolyte membrane typically comprises an ionomeric polymer. In one embodiment, the ionomeric polymer is a perfluorosulfonated ionomer electrolyte membrane. One aspect of the present invention is a fuel cell comprising one or more electrodes having the electro-catalyst.

BRIEF DESCRIPTION OF THE DRAWINGS

FIG. 6 depicts a cross-section of a polyoxometalate electrode of the present invention.

DETAILED DESCRIPTION

Figure 3:
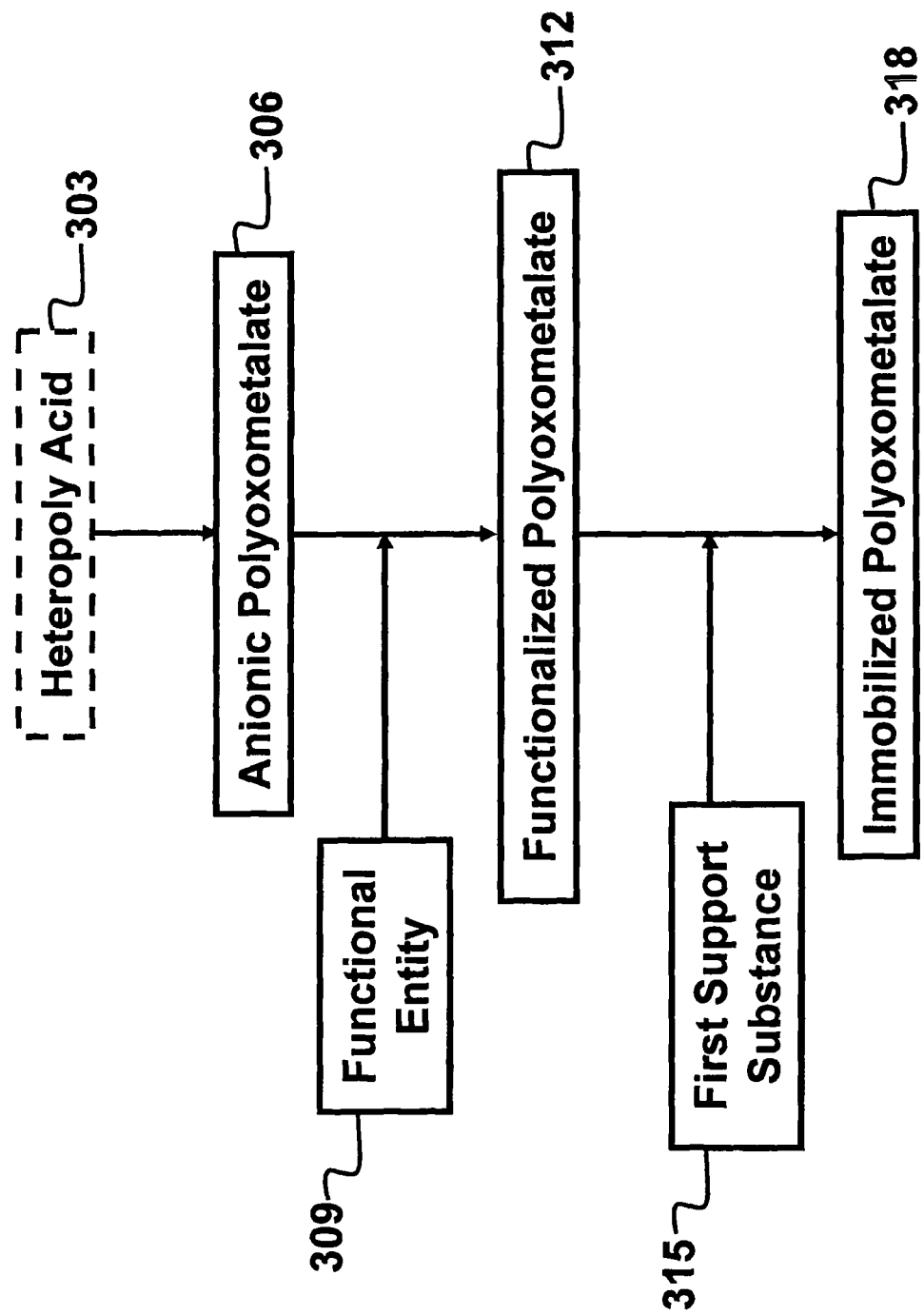
FIG. 3 depicts a method of preparing an immobilize polyoxometalate according to one embodiment of the present invention.

A process for preparing an immobilized polyoxometalate 318 from a heteropoly acid 303 is depicted in FIG. 3. The heteropoly acid 303 is generally characterized by the formula:

$$H_q^+[X_aM_bO_c]^{q-} \qquad (1)$$

where H is hydrogen, X is a hetero-element, M is an addenda-element, O is oxygen, 'q' commonly ranges from about 2 to about 30, 'a' typically ranges from about 1 to about 3, 'b' typically ranges from about 5 to about 25, and 'c' commonly ranges from about 20 to about 130. The hydrogen is generally a proton, that is H$^+$ and the oxygen is typically an anionic oxygen, that is, substantially O$^{2-}$. The heteropoly acid 303 can be provided or prepared.

The hetero-element is typically selected from IUPAC groups 7, 8, 9, 11, 12, 13, 14, 15, 16, and 17. Boron, aluminum, silicon, germanium, phosphorous, arsenic, iron, manganese, cobalt, copper, zinc, or combinations thereof are non-limiting examples of typical hetero-elements. Typically, IUPAC p-group elements 13, 14, 15, and 16 are preferred. More preferred are boron, aluminum, silicon, germanium, phosphorous, and arsenic. The ionic charge of the hetero-element generally ranges from about 1 to about 6. Preferably, the hetero-element ionic charge ranges from about 3 to about 4.

The addenda-element is generally a transition metal, typically selected from the IUPAC groups 3, 4, 5, 6, 7, 8, 9, 10, 11, and 12. Preferably, the addenda-element is one of molybdenum, tungsten, vanadium, tantalum, niobium, osmium, or combinations thereof. In general, the ionic radius of the addenda-element ranges from about 0.4 Angstroms to about 0.9 Angstroms. The preferred ionic radius of the addenda-element ranges from about 0.5 Angstroms to about 0.7 Angstroms. Preferably, the ionic charge of the addenda-element ranges from about +2 to about +8. More preferably, the addenda-element ionic charge ranges from about +5 to about +6. Stated another way, the addenda-element is preferably a transition metal having a $d^0$ or $d^1$ electronic configuration. Non-limiting examples of preferred addenda-elements are vanadium (V), tantalum (V), molybdenum (VI) and tungsten (VI).

In general, the addenda-element and oxygen form a building unit. Typically, the building unit resembles an octahedral shape, having oxygens at the apexes and the addenda-element generally located near the center of the octahedral shape. One or more hetero-elements commonly form bonds with a plurality of the building units, typically, to one or more oxygens comprising the building unit to form a polyoxometalate anion 306 of the heteropoly acid 303. It can be appreciated that, the polyoxometalate anion 306 is the conjugate anion of the heteropoly acid 303. Additionally, the polyoxometalate anion can be associated with cations other than the protons of the heteropoly acid 303. Suitable cations are elements of the IUPAC groups 1 and 2, preferably, but not limited to, potassium, sodium, cesium, magnesium, calcium, lithium, or mixtures thereof. It can be appreciated that, quaternary nitrogen compounds are also suitable cations. Preferred quaternary nitrogen cations are quaternary ammonia ($NH_4^+$) and quaternary amines ($R^1R^2R^3R^4N^+$), where the $R^{1-4}$ groups are an alkyl or aryl that are the same or differ and/or two or more of the $R^{1-4}$ groups may be connected.

In one embodiment, the polyoxometalate anion 306 can be formed by deprotonation of one or more of the acidic hydrogens comprising the heteropoly acid 303. In other embodiments, the polyoxometalate 306 anion can be synthetically prepared or provided. The deprotonation of the heteropoly acid 303 can be by, but is not limited to, Lewis and/or Brønsted-Lowry bases, ion exchange, or other commonly known methods for removing acidic hydrogens. In one preferred embodiment, the heteropoly acid 303 is deprotonated by one or more of the following bases: potassium carbonate, potassium hydroxide, sodium hydroxide, or combinations thereof.

In one aspect of the present invention, one or more of the following polyoxometalate anionic 306 structures are generally preferred:

| | |
|---|---|
| Keggin | $X^{n+}M_{12}O_{40}^{(8-n)-}$ |
| Dawson | $X_2^{n+}M_{18}O_{62}^{(16-2n)-}$ |
| Anderson | $X^{n+}M_6O_{24}^{(12-n)-}$ |
| Lacunary | $X^{n+}M_{11}O_{39}^{(12-n)-}$, |
| | $X^{n+}M_{10}O_{36}^{(12-n)-}$, |
| | $X^{n+}M_9O_{34}^{(14-n)-}$, |
| | $X_2^{n+}M_{17}O_{61}^{(16-2n)-}$, or |
| | $X_2^{n+}M_{15}O_{56}^{(18-2n)-}$ |
| Waugh | $X^{n+}M_9O_{32}^{(10-n)-}$ |
| Silverton | $X^{n+}M_{12}O_{42}^{(12-n)-}$ |

Anionic polyoxometalates 306 based on the Keggin and Dawson structures are typically more preferred. Even more preferred are the Lacunary polyoxometalate 306 structures of $[\alpha\text{-}SiW_{11}O_{39}]^{8-}$, $[SiW_{10}O_{36}]^{8-}$, $[SiW_9O_{34}]^{10-}$, $[\alpha\text{-}PW_{11}O_{39}]^{7-}$, $\alpha_2\text{-}[P_2W_{17}O_{61}]^{10-}$, $[\alpha\text{-}PMo_{11}O_{39}]^{7-}$, $[P_2W_{15}O_{56}]^{12-}$, or mixtures thereof. Stated another way, the Lacunary polyoxometalate 306 structures having one or more of the building units removed are preferred.

The polyoxometalate 306 can be "saturated" or "unsaturated". "Saturated" means the polyoxometalate 306 does not have a building unit removed (that is, a vacant site is not present within the structure) and "unsaturated" means the polyoxometalate 306 has one or more building units removed (that is, vacant sites exist within the structure). The unsaturated polyoxometalate 306 typically has at least about one and at most about five missing building units. Preferably, the polyoxometalate 306 typically has from about one to about three missing building units.

In another embodiment, unsaturated polyoxometalates 306 having one or more missing building units can be directly prepared by controlling the stoichiometry of heteroatom and addenda atom oxides and pH during the synthetic preparation of the polyoxometalate anion 306, such that, the equilibrium prefers the unsaturated polyoxometalate anion 306.

Typically, the silicon and phosphorous hetero-elements within the polyoxometalate 306 are interchangeable, as for example, the silicon of $[\alpha\text{-}SiW_{11}O_{39}]^{8-}$ can be exchanged to form $[\alpha\text{-}PW_{11}O_{39}]^{7-}$. It can be appreciated that, exchanging silicon for phosphorous (or phosphorous for silicon) affects the charge on the polyoxometalate 306 anion. Stated another way, within a particular polyoxometalate 306 structure the hetero-elements are interchangeable.

Another aspect of the present invention is modifying the physical properties of the polyoxometalate 306 through the chemical composition and structure of the polyoxometalate 306. In one embodiment, the polyoxometalate 306 oxidation-reduction potential is varied by changing the addenda-element within the polyoxometalate 306. While not wanting to be bound by any theory, the polyoxometalates 306 having vanadium as the addenda-element commonly have high oxidation-reduction potentials, typically, but not limited to, potentials ranging from about 500 mV to about 800 mV versus the standard hydrogen electrode. High oxidation-reduction potential polyoxometalates 306 typically have three or more vanadium atoms per anion. Keggin and/or Lacunary-Keggin structures having three or vanadium atoms typically have high oxidation-reduction potentials. A method of preparing the vanadium polyoxometalates 306 is by exchanging the molybdenum of a phosphomolybdic acid with vanadium. In one preferred embodiment, the three molybdenum atoms of 12-phosphomolybdic acid are exchanged with vanadium, typically by an aqueous solution exchange process using soluble vanadium oxides at ambient or elevated temperatures. While, on the other hand, polyoxometalates 306 having low oxidation reduction potentials typically have Wells-Dawson structures with a pyramidal $SO_3^{2-}$.

In one aspect, the anionic polyoxometalate 306 is contacted and reacted with a functional entity 309 to form a functionalized polyoxometalate 312. The functional entity 309 commonly has the following generalized structure:

$$F\text{—}Z\text{—}Q \quad (2)$$

where, F is a first reactive entity, Q is a second reactive entity, and Z is a linking radical. The functional entity 309 can be supplied or prepared by commonly known synthetic procedures.

In another aspect, the first reactive entity F reacts with the anionic polyoxometalate 306 to form a chemical bond between the functional entity 309 and the anionic polyoxometalate 306. That is, the first reactive entity F chemically reacts with and forms a chemical bond with one of the oxygen, addenda- or hetero-elements of the polyoxometalate 306. Preferably, the first reactive entity F chemically reacts with the polyoxometalate 306 to form a chemical bond with the oxygen of the polyoxometalate 306 anion. Examples of preferred chemical bonds linking the polyoxometalate 306 with the functional entity 309 comprise, without limitation, —O—Si—, —O—P—, —O—Sn—, —O—Ti—, —O—Ge— and —O—Zn—. It can be appreciated that, the oxygen in the chemical bond linking the polyoxometalate 306 to the functional entity 309 is substantially covalently bonded to the polyoxometalate 306. Additionally, it can be appreciated that, one of the silicon, phosphorous, tin, titanium, germanium, or zirconium, in the chemical bond linking the polyoxometalate 306 to the functional entity 309, and comprises respectively a portion of the first reactive entity F of the functional entity 309 which is substantially covalently bonded to the linking radical Z.

Preferably, the first reactive entity F reacts with at least one oxygen of the polyoxometalate 306. In some instances, the first reactive entity F of the functional entity 309 reacts with one or more oxygens of polyoxometalate 306 to form a plurality of chemical bonds linking the polyoxometalate 306 (or plurality of polyoxometalates 306) with the functional entity 309.

It can be appreciated that, the functionalized polyoxometalate 312 can have one or more functional entities 309 chemically bonded thereto. Preferably, the average number of functional entities 309 chemically bonded to the functionalized polyoxometalate 312 preferably, ranges from about 1 to about 10, and more preferably from about 2 to about 4 functional entities 309 per functionalized polyoxometalate 312. Stated another way, preferably at least about 0.2% of the mass of the functionalized polyoxometalate 312 comprises the functional entities 309 chemically bonded thereto. More preferably, at least about 0.5%, more preferably at least about 5% of the mass of the functionalized polyoxometalate 312 comprises the functional entities 309 bonded to the functionalized polyoxometalate 312.

The linking radical Z is generally any alky, aryl, or combinations thereof radical. Alkyl radical generally means any straight-chained, branched, or cyclic, saturated or unsaturated hydrocarbon entity typically comprising carbon and hydrogen. The alkyl radical, preferably, has from about 1 to about 25 carbon atoms. Generally, the alkyl radical atomic mass ranges from about 14 to about 700 atomic mass units. Aryl radical generally means any linear, branched, or cyclic (aromatic or pseudo-aromatic) hydrocarbon entity typically comprising carbon and hydrogen. Generally, the aryl radical atomic mass ranges from about 40 to about 800 atomic mass units and from about 4 to about 50 carbon atoms. It can be appreciate that, alkyl and aryl radicals can optionally include one or more chemical substituents having oxygen, sulfur, nitrogen, chlorine, bromine, fluorine, or combinations thereof.

The second reactive entity Q is an organofunctional group capable of forming a covalent bond when contacted and reacted with a first support substance 315. The second reactive entity can react directly with the first support substance 315. The second reactive entity Q can be converted to a chemical entity capable of reacting and forming a chemical bond with the first support substance 315. Preferably, the second reactive entity Q is, without limitation, amine, thiol, aniline, olefin, vinyl, styrenyl, or alcohol entity.

In one embodiment, the functional entity 309 is a silane generally represented by the following formula:

$(RO)_3Si$—Z-Q  (3)

$(RO)_3Si$ corresponds to the first reactive entity F of the above general formula (2). In one embodiment, RO comprises a hydrolysable akyloxy group, such as, but not limited to, methoxy, ethoxy, or acetoxy. The hydrolysable group reacts and bonds with the polyoxometalate anionic 306 to form the functionalized polyoxometalate 312. Preferably, at least one of the hydrolysable groups of the functional entity 309 depicted in formula (3) reacts with one of the oxygens comprising the anionic polyoxometalate 306 to form functionalized polyoxometalate 312. While not wanting to be bound by any theory, the hydrolysable group RO of the functional entity 309 reacts with one of the oxygens of the anionic polyoxometalate 306 to form one or more covalent bonds generally comprising at least in part, —Si—O—, linking the functional entity 309 and polyoxometalate 306 to form the functionalized polyoxometalate 312.

The Z and Q of formula (3) correspond respectively to the liking radical Z of and second reactive entity Q of general formula (2). In other words, the linking group Z of formula (3) is preferably a radical comprising alkyl, aryl, or combinations thereof. More preferably, the linking group Z of formula (3) is selected from the group consisting essentially of ethyl, proply, and phenyl. The second reactive entity Q of formula (3) is an organofunctional group capable of forming a covalent bond when contacted and reacted with the first support substance 315, or when chemically converted to an entity capable of reacting with the first support substance 315. Preferably, the second reactive entity Q of formula (3) comprises one of amino, vinyl, styrenyl, aniline, olefin, alcohol, and thiol. More preferably, the second reactive entity is a primary amine, or vinyl, or styrenyl. Even more, preferably, the second reactive entity is a primary amine capable of being converted to a diazonium.

Suitable non-limiting examples silane functional entities are: vinyl tri(methoxyethoxy) silane, aminopropyltriethoxy silane, aminopropyltrimethoxy, aminopropylmethyldiethoxy silane, aminopropylmethyldi-methoxy silane, aminoethylaminopropyltrimethoxy silane, aminoethylaminopropyltriethoxy silane, aminoethylaminopropylmethyldimethoxy silane, diethyelenetriamino-propyltrimethoxy silane, diethyenetriaminopropyltriethoxy silane, hexanediamino-methyltriethoxy silane, diethyenetriaminopropylmethyldimethoxy silane, diethyenetriaminopropylmethydiethoxy silane, methacryloxypropyltrimethoxy silane, methacryloxypropyltriethoxy silane, methacryloxypropyldimethoxy silane, vinyltrimethoxy silane, vinyltriethoxy silane, vinyltri(2-methoxyethoxy) silane, vinyltrisisopropoxy silane, vinlytris (tert-butylperoxy) silane, vinyldimethyethoxy silane, vinlymethyldimethoxy silane, vinyl methyldiethoxy silane, aminophenyltrimethoxy silane, aminophenyltriethoxy silane, aminodiphenyldimethoxy silane, aminodiphenyldiethoxy silane, amino(methyldiphenylethoxy) silane, amino (methyl phenyl diethoxy) silane, p-aminophenyltrimethoxy silane, p-aminophenyltriethoxy silane, p-aminophenylphenyldimethoxy silane, p-aminophenylphenyldiethoxy silane, methyl p-aminophenylphenylethoxy silane, p-aminophenylmethyldiethoxy silane, m-aminophenyltrimethoxy silane, m-aminophenyltriethoxy silane, m-aminophenylphenyldimethoxy silane, m-aminophenylphenyldiethoxy silane, methyl m-aminophenylphenylethoxy silane, m-aminophenylmethyldiethoxy silane, o-aminophenyltrimethoxy silane, o-aminophenyltriethoxy silane, o-aminophenylphenyldimethoxy silane, o-aminophenylphenyldiethoxy silane, methyl o-aminophenylphenylethoxy silane, o-aminophenylmethyldiethoxy silane, p-, m-, or o-amino benzene trimethoxy silane, p-, m-, or o-amino benzene trichloro silane, p-, m-, or o-thio benzene trimethoxy silane, p-, m-, or o-thio benzene trichloro silane, and 1-thio 2, trimethoxy silyl ethane.

In another embodiment of the functional entity 309 is phosphorous-containing entity having the general chemical structure:

$(O=)_xP(OR)_a(Z-Q)_b(Z'-Q')_c$  (4)

In other words, the phosphorous-containing entity can be a phosphate, phosphonate, phosphinate, phosphate, phosphonite, phosphinite, phosphine or mixture thereof. The RO is a hydrolysable akyloxy group as described above for the silane of formula (3), Z and Z' of formula (4) are the same as described above for Z in formulae (2) and (3), and similarly Q and Q' of formula (4) are the same described above for Q in formulae (2) and (3). It can be appreciated that, the second reactive entities Q and Q' can be the same or differ. Likewise, the linking radicals Z and Z' can be the same or differ. While not wanting to be bound by any theory, the hydrolysable group RO reacts of the functional entity 309 with one of the oxygens of the anionic polyoxometalate 306 to form a covalent bond generally comprising at least in part, —P—O—, linking the functional entity 309 and polyoxometalate 306 portions of the functionalized polyoxometalate 312. Similarly, the Q' is a chemical entity which can react with the polyoxometalate 306 to form a chemical bond therewith. While not wanting to be bound by any theory, the hydrolysable group Q' reacts of the functional entity 309 with one of the oxygens of the anionic polyoxometalate 306 to form a covalent bond generally comprising at least in part of an —O— linkage between the functional entity 309 and polyoxometalate 306 portions of the functionalized polyoxometalate 312. The x can have a value of zero or one. The sum of subscripts a, b, and c equals three, and subscripts a, b, and c, respectively, can equal zero, one or two.

In yet another embodiment the functional entity 309 is a metal-containing entity having the general chemical structure:

$$X_3\text{-T-Z-Q} \qquad (5)$$

The first reactive entity F comprises $X_3$-T-, where X can be one of chloride, bromide, iodide, hydroxyl, methoxy, ethoxy, acetoxy, or combinations thereof, and where T is one of Sn, Ge, Ti, or Zn. The linking radical Z is generally alkyl, aryl, cyclopentadiene, or combinations thereof. As above, the second reactive entity Q is typically an amine, diazonium, thiol, vinyl, styrenyl, hydroxyl, or alcohol entity.

The first support substance 315 is contacted and/or reacted with the functionalized polyoxometalate 312 to form an immobilized polyoxometalate 318. Specifically, the second reactive entity Q reacts with the first support substance 315, covalently bonding the functionalized polyoxometalate 312 to the first support substance 315 forming the immobilized polyoxometalate 318. While not wanting to be bound by any theory, in one embodiment, the chemically bonded functionalized polyoxometalate 312 forms substantially about a monolayer of the functionalized polyoxometalate 312 on the first support substance 315. In another embodiment, the chemically bonded functionalized polyoxometalate 312 forms substantially a crystalline polyoxometalate 312 surface on the first support substance 315. The crystalline size typically ranges from about 0.1 μm to about 10 μm, more typically, from about 1 μm to about 2 μm. The first support substance 315 and functionalized polyoxometalate 312 can be contacted and/or reacted in an electrolyte. It can be appreciated that, the electrolyte can be aqueous or non-aqueous. Preferably, the electrolyte comprises one of water, acetonitrile, or mixtures thereof.

Typically, the first support substance 315 is a fine black powder. That is, the first support substance 315 is a fine particulate substance, preferably with an average particle size ranging from about 5 nm to about 100 nm. More preferably, the average particle size of the first support substance ranges from about 20 nm to about 50 nm. It can be appreciated that, the first support substance can be in the form of an aggregate. The preferred aggregate size ranges from about 10 nm to about 200 nm, more preferred, the aggregate size ranges from about 20 nm to about 130 nm.

The surface of the first support substance 315 typically has one or more reactive entities. The reactive entities of first support substance 315 when contacted and reacted with the second reactive entity Q of the functionalized polyoxometalate 312 chemically bonds the functionalized polyoxometalate 312 to the first support substance 315 to form the immobilized polyoxometalate 318. Non-limiting examples of typical first support substance 315 reactive entities are carbon, metal, hydroxyl, oxide, amine, alcohol, aldehyde, anhydride, ketone, ester, carboxylate, vinyl, acetylene, and thiol. One or more of the first support substance 315 reactive entities react with the second reactive entity Q or chemical derivative of reactive entity Q.

Preferably, the second reactive entity Q is vinyl, amine, olefin, alcohol, thiol, aniline, or combinations thereof. In one embodiment the second reactive entity Q is chemically converted to chemical derivative of second reactive entity Q before contacting and reacting with the first support substance 315. One non-limiting example of a typical chemical conversion is the formation of a diazonium ion when the second reactive entity Q is a primary amine. Typically, the product of the chemical reaction of the second reactive entity Q, or its chemical derivative thereof, with one or more of the first support substance 315 reactive entities is a chemical linkage and/or bond between the first support substance 315 and functionalized polyoxometalate 312. While not wanting to be bond by any theory, typically the chemical linkage comprises with limitation the following chemical entities: —$CH_2$—, —$CHR^1$—, —$CR^1R^2$—, —S—, —NH—, —$NR^1$— —N=N—, —$CH_2CH_2$—, —C(=O)O—, —O—, thereof, where typically $R^1$ and/or $R^2$ are alkyl or aryl groups, as defined above.

The chemical reaction of the second reactive entity Q (or its chemical derivative thereof) with one or more of the first support substance 315 reactive entities is typically conducted by commonly known chemical procedures. In one embodiment, the second reactive entity Q is a vinyl entity, the reaction of the vinyl entity with the first support substance 315 can proceed by commonly known vinyl free radical reaction procedures, such as, but not limited to, chemical (e.g., free radical chemical initiators) or photochemical (e.g., ultra-violet or electron-beam irradiation). In another embodiment, the second reactive entity Q is a diazonium salt, where the reaction can proceed by commonly known thermal and/or electrochemical decomposition of the diazonium salt. In yet another embodiment, the first support substance 315 reactive entities are anhydride and/or carboxylate groups, where the reaction of these groups with second reactive entity Q can proceed by, for example, commonly known esterification and/or amidization reactions with suitable second reactive entity Q groups, such as, alcohol, aniline, thiol, or amine. In still yet other embodiments, other commonly known thermal, pH control, electrochemical, chemical initiator, photochemical, and/or catalytic procedures for amine, alcohol, aniline, diazonium, vinyl, and thiol reactions can be utilized in reacting second reactive entity Q, or its chemical derivative thereof, with one or more of the first support substance 315 reactive entities.

One or more functionalized polyoxometalates 312 can be chemically bonded to a single particle of the first support substance 315. In one embodiment, at least some of the particles comprising the first support substance 315 have at least one functionalized polyoxometalate 312 chemically bonded thereto. More preferably, at least most of the first support substance 315 particles have at least one functionalized polyoxometalate 312 bonded thereto. Stated another way, typical loadings of the functionalized polyoxometalate 312 on the first support substance 315, preferably, ranges from about 5 wt % to about 95 wt % based on the first support substance 315. Stated yet another way, the average number of functionalized polyoxometalates 312 chemically bonded to a single first support substance 315 typically ranges from about 0.5 to about 10. Preferably, the average number of functionalized polyoxometalate 312 chemically bonded to a single first support substance 315 ranges from about 0.75 to about 2.

Regarding the first substance 315, non-limiting examples of suitable first support substance 315 black powders are: carbon, iron, manganese, rhenium, tungsten, molybdenum, chromium, titanium, zirconium, hafnium, tantalum, niobium, vanadium, ruthenium, osmium, tin, aluminum, gallium, indium, thallium, bismuth, cadmium, germanium, silicon, yttrium, lanthanide, the lanthanide group metals, cobalt, rhodium, iridium, nickel, palladium, platinum, copper, silver, gold, or mixtures and alloys of these metals. Preferably, the first support substance 315 is one of carbon, metallic, or platinum black powders, and mixtures thereof. Suitable carbon blacks are typically channel, furnace or thermal carbon blacks, commonly made by controlled pyrolysis of hydrocarbons, acetylene, or other carbon sources. Preferred carbon blacks are Vulcan™ XC72R and/or Ketjen™ black. Preferably, the carbon black has a pore volume ranging from about 100 ml/100 g to about 1000 ml/100 g. More preferably, the pore volume ranges form about 250 ml/100 g to about 750 ml/100 g. Additionally, the preferred carbon black has an iodine adsorption value ranging from about 500 mg/g to about 1500 mg/g, with more preferred iodine values ranging from about 650 mg/g to about 1250 mg/g. The carbon black, preferably, has a pH value ranging from a pH of about pH 7 to a about pH 11, more preferably, ranging from a pH from about pH 8 to about pH 10. The carbon black has an ash value. The preferred ash value is at most about 1%, more preferred of about at most about 0.2%, and even more preferred the ash value is at most about 0.1%. Preferably, the carbon black is typically substantially free from impurities such as sulfur, chloride, ammonia and metals. In one embodiment, the carbon black can be glassy and/or amorphous.

In another aspect, prior to contacting with the functionalized polyoxometalate 312, the carbon black is pretreated, by one of a high pH washing, a low pH washing, or sequential high and low pH washings. In one embodiment, the carbon black is washed in a high pH solution having a pH of at least about pH 11. Lewis and/or Brønsted-Lowry bases, substantially comprising hydroxide anions, having a pH of at least about pH 13 are preferred. Non-limiting examples of such bases are hydroxide salts having one of ammonium or IUPAC groups 1 and 2 cations. In another embodiment, the carbon black is washed in a low pH solution having a pH of at most about pH 4. While not wanting to be bound by any theory, the low pH washing typically removes contaminates, such as, but limited to metal contaminates. Lewis and/or Brønsted-Lowry acids, substantially comprising hydroxide anions, having a pH of at least about pH 2 are preferred. Non-limiting examples of such acids are HCl, HBr, HI, HF, $H_2SO_4$, $HNO_3$, $H_3PO_4$, acids of oxides of IUPAC groups 13, 14, 15, or 16, and mixtures thereof. It can be appreciated that, the sequential high and low pH washing can be any order. That is, the low pH washing can proceed or follow the high pH washing, or the high pH washing can proceed or follow the low pH washing.

In another embodiment, the black powder comprises platinum black or platinum black powder having at least one of the following metals: ruthenium, rhodium, iridium, nickel, palladium, osmium, copper, silver, or gold.

Figure 1:
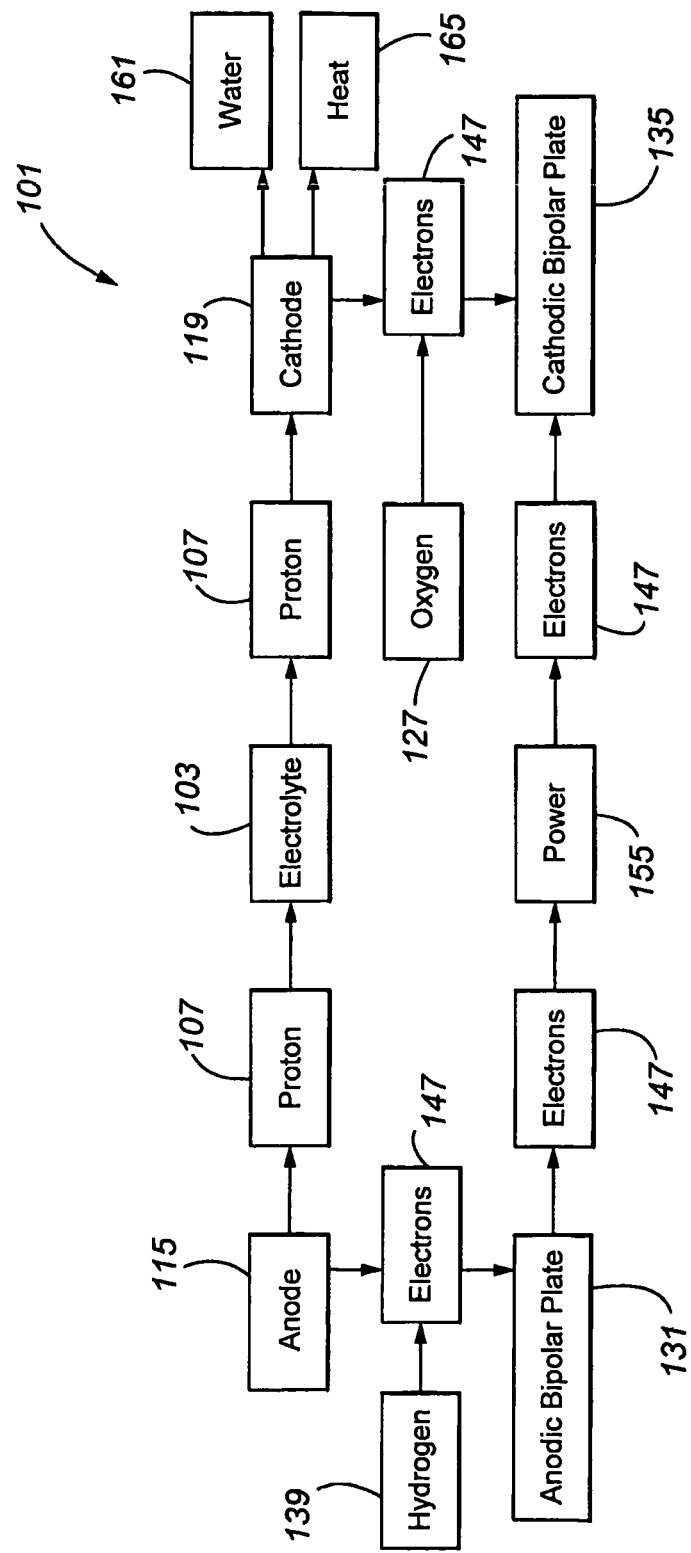
FIG. 1 depicts a typical fuel cell of the prior art.
Figure 2:
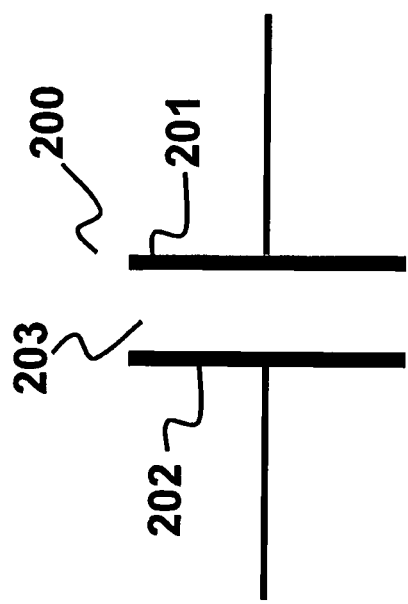
FIG. 2 depicts a typical capacitor of the prior art.
Figure 7:
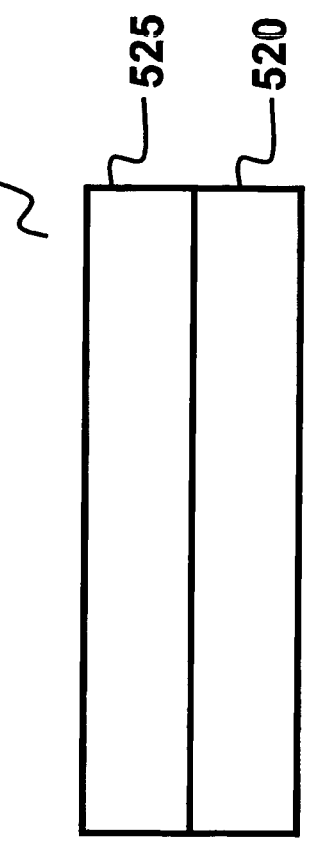
FIG. 7 depicts a cross-section of another polyoxometalate electrode of the present invention.
Figure 5:
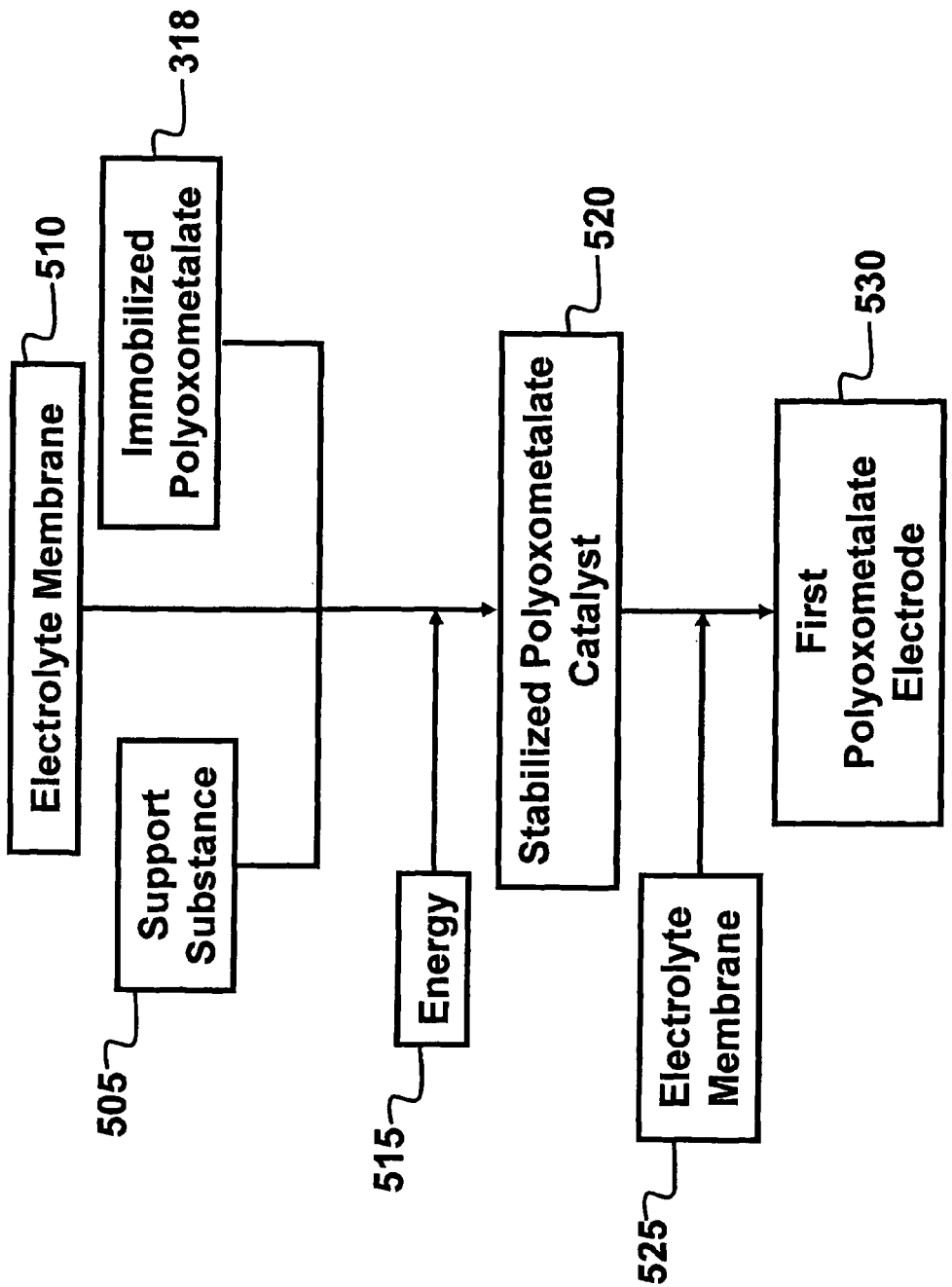
FIG. 5 depicts another method of preparing a polyoxometalate electrode according to another embodiment of the present invention.

FIGS. 5 and 7 depict a method of preparing a first polyoxometalate electrode 530 having a stabilized polyoxometalate catalyst 520. The stabilized polyoxometalate catalyst 520 comprises immobilized polyoxometalate 318, catalyst support substance 505, and electrolyte membrane 510.

The stabilized polyoxometalate catalyst 520 is prepared by contacting the catalyst support substance 505 and electrolyte membrane 510 with the immobilized polyoxometalate 318 and applying energy 515. The catalyst support substance 505 is a black powder as described above for the first support substance 315.

In one preferred embodiment, the catalyst support substance 505 is one of a platinum salt, platinum black powder, or platinum alloy black powder. Non-limiting examples of suitable platinum salts are hexachloroplatinate, platinum dichloride, disodium tetrachloroplatinate, and platinum acetate. It can be appreciated that, the platinum salts are typically reduced, chemically or electrochemically, to substantially form a metallic platinum powder. The platinum salt reduction can be before, while, or after the contacting of the immobilized polyoxometalate 318 with the catalyst support substance 505.

In one preferred embodiment, the electrolyte membrane 510 is a sulfonated tetrafluroethylene copolymer, commonly manufactured under the trade-name NAFION® by DuPont de Nemours. While not wanting to be bound by any theory, NAFION® commonly has perfluorovinyl ether groups terminated with sulfonate groups onto a sulfonated tetrafluoroethylene polymeric backbone. In another preferred embodiment, electrolyte membrane 510 is a sulfonated tetrafluroethylene copolymer solution, preferably as a mixture of water, isopropanol, and sulfonated tetrafluroethylene copolymer. Preferably, the weight percent of sulfonated tetrafluroethylene copolymer in the sulfonated tetrafluroethylene copolymer solution ranges from about 1 wt % sulfonated tetrafluroethylene copolymer to about 50 wt % sulfonated tetrafluroethylene copolymer, more preferably, from about 5 wt % sulfonated tetrafluroethylene copolymer to about 15 wt % sulfonated tetrafluroethylene copolymer.

Sulfonated tetrafluoroethylene polymers are ionomers, a class of polymers with ionic properties, the ionic properties arise from proton exchange between sulfonic acid groups within the sulfonated polymeric system. Sulfonated tetrafluorethylene polymers generally resist chemical attack, have excellent temperature stability, up to about 190° C., are selectively and highly permeable to water, and can be manufactured with various levels of cationic conductivities. Typically, the sulfonated tetrafluorethylene copolymer ionomers is generally substantially fully hydrated.

The energy 515 is commonly a dispersing and/or homogenizing energy. That is, the energy 515 can be supplied by an ultrasonic, mixing, shearing, or homogenizing device. Preferably, the energy 515 is supplied for about, at most, 24 hours, more preferably at most about 5 hours. In one embodiment, the homogenizing energy typically ranges from about 5 Watts to about 1,000 Watts.

In the final step, the first polyoxometalate electrode 530 is prepared by contacting the stabilized polyoxometalate catalyst 520 with an electrode 525. In one embodiment, the stabilized polyoxometalate catalyst 520 is contacted with the electrode 525 by electronically controlled air brushing the stabilized polyoxometalate catalyst 520 onto the electrode 525. The stabilized polyoxometalate catalyst 520 forms a layer on the electrode 525, preferably, as a substantially continuous layer. The stabilized polyoxometalate catalyst 520 layer typically has a thickness of at least about 0.01 micrometers to at most about 50 micrometers, more typically at least about 0.1 micrometers to at most about 5 micrometers. The preferred platinum loading of the stabilized polyoxometalate catalyst 520 layer ranges from about 0.01 mg Pt/$cm^2$ to about 10 mg Pt/$cm^2$, more preferred, the platinum loading ranges from about 0.1 mg Pt/$cm^2$ to about 1 mg Pt/$cm^2$. In one embodiment, the electronically controlled air brush has a nozzle diameter commonly ranging from about 0.5 mm to about 10 mm.

In one aspect of the present invention, the electrode 525 is generally a "graphitized" carbon fiber-based nonwoven, paper, or felt. While not wanting to be bound by any theory, the non-woven design generally allows for transport of reactants into and/or products out of the polyexometalate electrocatalyst 520 layer. In one embodiment, the preferred areal weight of the electrode 525 ranges from about 75 g/$m^2$ to about 200 g/$m^2$, the more preferred areal weight ranges from about 100 g/$m^2$ to about 150 g/$m^2$. Preferably, the thickness of the electrode 525 is about 160 mils. The electrode 525 has an air permeability ranging from about 1 $cm^3$/$cm^2$·s to about 90

$cm^3/cm^2 \cdot s$, preferably, ranging from about 1 $cm^3/cm^2 \cdot s$ to about 5 $cm^3/cm^2 \cdot s$. The preferred electrical resistance to the electrode 525 is at most 20 $m\Omega cm^2$.

In another aspect, the first polyoxometalate electrode 530 is an efficient and/or effective cathode, for electrochemically oxidizing methanol, dimethyl ether, ethanol, and formic acid. In another aspect, the first polyoxometalate electrode 530 exhibits reduced decomposition of the electrolyte membrane 510. In one embodiment, the first polyoxometalate electrode 530 exhibits reduced decomposition of the perfluorosulfonated ionomer electrolyte membrane 510. Stated another way, the first electrode 530 typically exhibits reduced fluoride ion production during electrochemical cell operation. Stated yet another way, during electrolytic operation the perfluorosulfonated ionomer electrolyte membrane 510 is more stable in the first polyoxometalate electrode 530 comprising the stabilized polyoxometalate catalyst 520 than typical, fuel cell electrodes. That is, the level of fluoride produced, in a fuel cell having one or more stabilized polyoxometalate catalyst 520 electrodes, typically ranges from about 0.4 $\mu g/day/cm^2$ to about 2 $\mu g/day/cm^2$ of fluoride.

Figure 4:
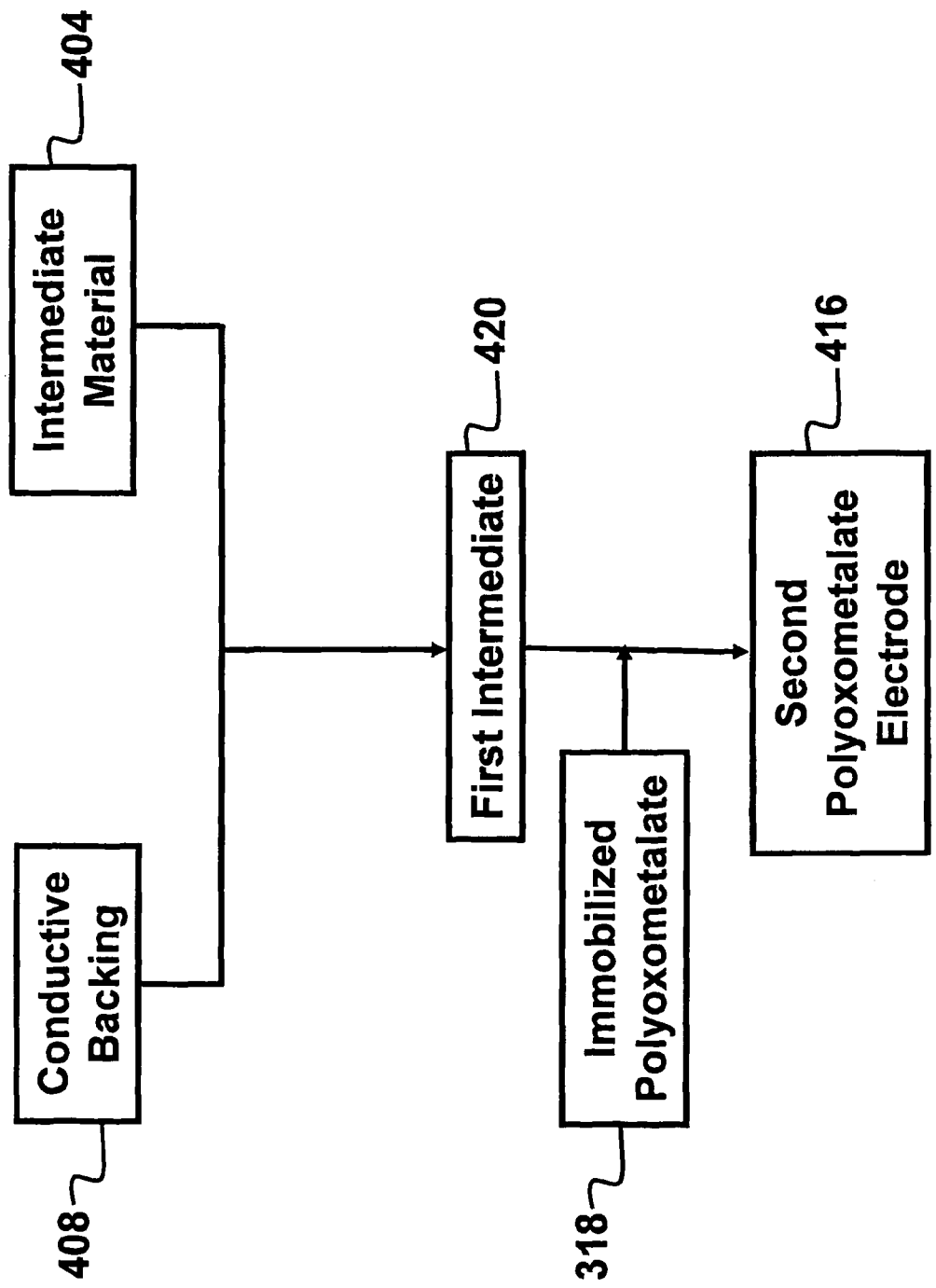
FIG. 4 depicts a method of preparing a polyoxometalate electrode according to another embodiment of the present invention.

FIGS. 4 and 6 depict a method of preparing a second polyoxometalate electrode 416 having an immobilized polyoxometalate layer 618, a conductive backing 408, and an intermediate material layer 606. The intermediate material layer 606 is positioned between the immobilized polyoxometalate layer 618 and the conductive backing 408. The conductive backing 408 is any suitable backing, typically having an electrical resistance ranging from about 1 $\mu\Omega$ to about 1$\Omega$, preferably ranging from about 0.01$\Omega$ to about 0.1$\Omega$. Commonly, the conductive backing 408 comprises any conductive metal or graphitic material. Typical examples of conductive metals, without limitation, are any IUPAC periodic table group 3, 4, 6, 7, 8, 9, 10, 11, 12, or 13 elements, elements of groups 10, 11, and 13 are preferred. Graphitic carbon means any substance comprising carbon in the allotropic form of graphite. While not wanting to be bound by any theory, graphitic carbon generally comprises at least some three-dimensional hexagonal crystalline long-range order. It can be appreciated that, the graphitic intermediate material 404 can be a carbon black as disclosed and defined above.

The first intermediate 420 is formed by contacting the intermediate material 404 and the conductive backing 408. In one aspect of the present invention, the intermediate material 404 is screen printed on the conductive backing 408, using commonly known screen printing methods, forming the intermediate layer 606. The intermediate material layer 606 may be continuous or discontinuous (e.g. when printing a plurality of capacitors on the conductive backing 408 at a time). The thickness of the printed intermediate material layer 606 ranges from about 5 $\mu m$ to about 300 $\mu m$, preferably, the intermediate material layer 606 thickness ranges from about 10 $\mu m$ to about 100 $\mu m$. It can be appreciated that, the intermediate material 404 can be contacted with the conductive backing 408 by any commonly known method of applying a layer to a substance. Other non-limiting methods of printing the intermediate material 404 on the conductive backing 408 are ink jet printing, airbrush, and gravure.

The immobilized polyoxometalate 318 is contacted with the intermediate material 404 of the first intermediate 420 to form the second polyoxometalate electrode 416. In one aspect, the immobilized polyoxometalate 318 is screen printed on the intermediate material layer 606, the screen printed immobilized polyoxometalate 318 forms the immobilized polyoxometalate layer 618. Preferably, the immobilized polyoxometalate layer 618 is positioned on the intermediate layer 606. The polyoxometalate layer 618 thickness typically ranges from about 1 $\mu m$ to about 300 $\mu m$, preferably, the polyoxometalate layer 618 thickness ranges from about 5 $\mu m$ to about 100 $\mu m$. As above, the immobilized polyoxometalate 318 can be contacted by any commonly known method of applying a layer to a substance.

FIG. 8 depicts a supercapacitor of the present invention, the supercapacitor comprises second polyoxometalate electrodes 416 and 416' and an optional separator material 707, wherein second polyoxometalate electrodes 416 and 416' may be the same or differ, wherein the second polyoxometalate electrodes 416 and 416' may differ, for example, in addenda and/or hetero-elements. The separator material 707 can be any commonly known capacitor separator material. Non-limiting examples of typical capacitor separator material 707 are: Celagrd® 2500 (23 $\mu m$ thick, 47% porosity) and DSM Solutech Solupor® 3Po7A (13 $\mu m$ thick, 70% porosity).

EXAMPLES $K_{10}\alpha_2$-$[P_2W_{17}O_{61}]\cdot nH_2O$, $Na_7[PW_{11}O_{39}]\cdot nH_2O$, $\alpha$-$K_8SiW_{11}O_{39}\cdot nH_2O$, $[(CH_3)_4N]_4H_3[PMo_{11}O_{39}]\cdot nH_2O$ were prepared according to standard literature methods.

Other than in the examples, or where otherwise so indicated, all numeric values expressing quantities of ingredients, or materials, or reaction, or operating conditions used herein are to be understood as being modified in all instances by the term "about".

Example 1

50 grams of carbon black was added to 800 mL of 7M KOH solution, the resulting mixture was heated to reflux and maintained at reflux for 1 h. The carbon black was collected by filtration, added to deionized water, heated to reflux and maintained at reflux for 1 h. The carbon black was then added to 800 ml of concentrated sulfuric acid, the mixture was heated to reflux and maintained at reflux for 1 h. The carbon black was collected by filtration and rinsed with deionized water until the filtrate was neutral and dried in an oven at 95° C.

Example 2

An aqueous solution of sodium nitrite was prepared by dissolving 0.188 grams of $NaNO_2$ in 1 mL of deionized water.

Example 3

135.04 grams of $K_6$-$[\alpha$-$P_2W_{18}O_{62}]\cdot nH_2O$ was dissolved in 300 ml of distilled water at 40° C. with stirring. Potassium bicarbonate solution ($KHCO_3$, 500 mL of a 1 M solution, was added with vigorous stirring. A white precipitate formed after about 70 mL $KHCO_3$ solution was added, the reaction mixture was stirred for 1 hour, then cooled to about 4° C. in an ice-water bath. The white precipitate was collected by filtration, re-crystallized from boiling distilled water by first cooling to room temperature, and then by chilling overnight in a refrigerator at 5° C. The fine white product was collected by filtration, washed with 100 mL (2×50 mL) of ice-cold water (3-4° C.) and 100 mL (2×50 mL) anhydrous diethyl eater. Yield: 117.35 g (81.49%, 0.024 mole). $^{31}$P NMR: −6.6, −13.7 ppm (lit: −7.27, −14.11 ppm).

Example 4

73 grams sodium tungstate dehydrate, $Na_2WO_4 \cdot 2H_2O$, and 2.85 grams of anhydrous disodium hydrogenphosphate were dissolved in 200 mL of de-ionized water and heated to 80° C. The resulting solution was titrated with concentrated nitric acid (d 1.42 g/cm$^3$) to a pH of 4.8. The solution volume was reduced to half by heating, forming a dense lower layer containing the heteropoly anion, 100 ml of acetone was added and the dense heteropoly layer isolated. An equal volume of water was added to the isolated heteropoly layer, the heteropoly layer was separated and isolated with the aid of acetone; this procedure was repeated five times. Solid sodium undecatungstophosphate (Na$_7$[PW$_{11}$O$_{39}$].nH$_2$O) was obtained by evaporating to dryness. Yield: 51.47 g (80.5%). 400-MHz $^{31}$P NMR (DI water 25° C.) δ−10.1.

Example 5

182.1 grams of sodium tungstate dihydrate (Na$_2$WO$_4$.2H$_2$O) was dissolved in 300 mL of boiling de-ionized water. To the boiling tungstate solution, 165 mL of 4 M HCl was added dropwise with vigorous stirring over approximately a 30 min. period to dissolve any tungstic acid. A solution of metasilicate (11 grams of Na$_2$SiO$_3$, containing SiO$_2$ 44-47%, dissolved in 100 mL of de-ionized water) was quickly added. After the addition of the metasilicate 4 M HCl was added to adjust the pH approximately 5.4. The solution was kept boiling for 1 h, after which it was cooled to room temperature and filtered. Potassium chloride (150 g) was added to the filtrate, the resulting solution was stirred for 30 minutes; a white precipitate formed and was collected by filtration. The product was washed with 1 M KCl solution (2×50 mL), then with ice-cold water (50 mL), and dried in air. Yield: 136.1 g (84.5%). The product was characterized in the solid state by its IR spectrum (KBr pellet, cm$^{-1}$): 1000, 952, 885, 870 (sh), 797, 725, 625 (sh) 540, 520, 472 (sh), 430 (sh).

Example 6

Commercial phosphomolybdic acid hydrate (H$_3$PMo$_{12}$O$_{40}$.nH$_2$O) (7.3 g) was dissolved in 40 mL of hot water. Lithium carbonate (Li$_2$CO$_3$, 0.779 g) was added slowly (due it its low solubility in water it should be added in small amounts, each addition should dissolve before more lithium carbonate is added) to phosphomolybdic acid solution with vigorous stirring to bring the pH to 4.8. Tetrabutylammonium bromide (TMA-Br, 18 g) is added to the solution with vigorous stirring to precipitate the product. The product was collected by filtration, washed with de-ionized water, and allowed to dry in air overnight, re-crystallization from acetonitrile (CH$_3$CN) by slow evaporation (product should not be heated) of the solvent at room temperature. Yield: 8.57 g (78.7%).

Example 7

To 140 ml of an acetonitrile/water mixture (100 parts water:40 parts acetonitrile) a solution of p-aminophenyltrimethoxy silane (0.521 grams in 10 ml acetonitrile) was added drop-wise, the pH of the resulting solution was adjusted to 1.8 with 1 M HCl. 5 grams of Example 3, K$_{10}$α$_2$-[P$_2$W$_{17}$O$_{61}$].nH$_2$O, was slowly added to the silane solution, the pH was monitored and adjusted to 1.8 with 1M HCL as needed. After stirring for 20 hours at room temperature, after which it was chilled to in an ice-water bath to around 0-5° C. The diazonium salt of POM α$_2$-[P$_2$W$_{17}$O$_{61}$]$^{10-}$ is prepared by adding the solution prepared in Example 2 drop wise over a 1 minute period. 1 gram of carbon black prepared according to Example 1 was added to 100 ml of de-ionized water, the resulting mixture was heated to reflux; the POM diazonium salt solution was added drop-wise over a period of 30 minutes to the refluxing carbon black solution after the addition was completed the mixture was maintained at 95° C. with stirring, for 5-6 hours, placed in an oven-night and brought to dryness. The dry, solid product was washed with hot de-ionized water (200 ml), dried in an oven at 95° C., the dried product was subjected to Soxhlet extraction with ethanol for 6 hours, dried overnight in an oven, rinsed with de-ionized water and oven dried again overnight.

Example 8

To 140 ml of an acetonitrile/water mixture (100 parts water:40 parts acetonitrile) a solution of p-aminophenyltrimethoxy silane (0.521 grams in 10 ml acetonitrile) was added drop-wise, the pH of the resulting solution was adjusted to 1.8 with 1 M HCl. 2.84 grams of Example 4, Na$_7$[PW$_{11}$O$_{39}$].nH$_2$O, was slowly added to the silane solution, the pH was monitored and adjusted to 1.8 with 1M HCl as needed. After stirring for 20 hours at room temperature, after which it was chilled in an ice-water bath to around 0-5° C. The diazonium salt of POM PW$_{11}$O$_{39}$$^{7-}$ is prepared by adding the solution prepared in Example 2 drop wise over a minute period. 1 gram of carbon black prepared according to Example 1 was added to 100 ml of de-ionized water, the resulting mixture was heated to reflux; the POM diazonium salt solution was added drop-wise over a period of 30 minutes to the refluxing carbon black solution after the addition was completed the mixture was maintained at 95° C. with stirring, for 5-6 hours, placed in an oven-night and brought to dryness. The dry, solid product was washed with hot de-ionized water (200 ml), dried in an oven at 95° C., the dried product was subjected to Soxhlet extraction with ethanol for 6 hours, dried overnight in an oven, rinsed with de-ionized water and oven dried again overnight.

Example 9

To 140 ml of an acetonitrile/water mixture (100 parts water:40 parts acetonitrile) a solution of p-aminophenyltrimethoxy silane (0.521 grams in 10 ml acetonitrile) was added drop-wise, the pH of the resulting solution was adjusted to 1.8 with 1 M HCl. 3.23 grams of Example 5, α-K$_8$SiW$_{11}$O$_{39}$.nH$_2$O, was slowly added to the silane solution, the pH was monitored and adjusted to 1.8 with 1M HCl as needed. After stirring for 20 hours at room temperature, after which it was chilled in an ice-water bath to around 0-5° C. The diazonium salt of POM SiW$_{11}$O$_{39}$$^{8-}$ is prepared by adding the solution prepared in Example 2 drop wise over a 1 minute period. 1 gram of carbon black prepared according to Example 1 was added to 100 ml of de-ionized water, the resulting mixture was heated to reflux; the POM diazonium salt solution was added drop-wise over a period of 30 minutes to the refluxing carbon black solution after the addition was completed the mixture was maintained at 95° C. with stirring, for 5-6 hours, placed in an oven-night and brought to dryness. The dry, solid product was washed with hot de-ionized water (200 ml), dried in an oven at 95° C., the dried product was subjected to Soxhlet extraction with ethanol for 6 hours, dried overnight in an oven, rinsed with de-ionized water and oven dried again overnight.

Example 10

To 140 ml of an acetonitrile/water mixture (100 parts water:40 parts acetonitrile) a solution of p-aminophenyltrimethoxy silane (0.521 grams in 10 ml acetonitrile) was added drop-wise, the pH of the resulting solution was adjusted to 1.8 with 1 M HCl. 2.684 grams of Example 6, $[(CH_3)_4N]_4H_3[PMo_{11}O_{39}]\cdot nH_2O$, was slowly added to the silane solution, the pH was monitored and adjusted to 1.8 with 1M HCl as needed. After stirring for 20 hours at room temperature, after which it was chilled to in an ice-water bath to around 0-5° C. The diazonium salt of POM $PMo_{11}O_{39}^{7-}$ is prepared by adding the solution prepared in Example 2 drop wise over a 1 minute period. 1 gram of carbon black prepared according to Example 1 was added to 100 ml of de-ionized water, the resulting mixture was heated to reflux; the POM diazonium salt solution was added drop-wise over a period of 30 minutes to the refluxing carbon black solution after the addition was completed the mixture was maintained at 95° C. with stirring, for 5-6 hours, placed in an oven-night and brought to dryness. The dry, solid product was washed with hot de-ionized water (200 ml), dried in an oven at 95° C., the dried product was subjected to Soxhlet extraction with ethanol for 6 hours, dried overnight in an oven, rinsed with de-ionized water and oven dried again overnight.

Example 11

0.01 grams of platinum black and 0.01 grams of the product prepared in Example 8 are placed in a 5 cc syringe to which is added 1 g of methanol and 0.1 g of 5 wt % Nafion® solution. The syringe was capped and the plunger was inserted. This syringe was inserted in a vial so that the tip of the syringe was pointing down in the vial. Water was added to the vial so that the mixture of catalyst ink was covered but below the level of the plunger. This vial was placed in an ultrasonic bath for 4 hours. The ultrasonic bath used was from Fisher Scientific model FS20H, although any ultrasonic bath may be used. Ultrasonic energy was applied to the mixture for 4 hours. This ink was then applied directly to the microporous layer of a 10BB paper electrode from SGL carbon via an electronically controlled airbrush. The ink was pumped to the airbrush tip using a syringe pump. The dried ink formed a catalyst layer on the electrode of 3.4 micrometers thick having 0.15 mg $Pt/cm^2$. The exact loading of Pt and thickness of the catalyst layer depends on the amount airbrushed.

Example 12

0.01 grams of platinum black and 0.01 grams of the product prepared in Example 9 are placed in a 5 cc syringe to which is added 1 g of methanol and 0.1 g of 5 wt % Nafion® solution. The syringe was capped and the plunger was inserted. This syringe was inserted in a vial so that the tip of the syringe was pointing down in the vial. Water was added to the vial so that the mixture of catalyst ink was covered but below the level of the plunger. This vial was placed in an ultrasonic bath for 4 hours. The ultrasonic bath used was from Fisher Scientific model FS20H, although any ultrasonic bath may be used. Ultrasonic energy was applied to the mixture for 4 hours. This ink was then applied directly to the microporous layer of a 10BB paper electrode from SGL carbon via an electronically controlled airbrush. The ink was pumped to the airbrush tip using a syringe pump. The dried ink formed a catalyst layer on the electrode of 3.4 micrometers thick having 0.15 mg $Pt/cm^2$. The exact loading of Pt and thickness of the catalyst layer depends on the amount airbrushed.

Example 13

0.01 grams of platinum black and 0.01 grams of the product prepared in Example 10 are placed in a 5 cc syringe to which is added 1 g of methanol and 0.1 g of 5 wt % Nafion® solution. The syringe was capped and the plunger was inserted. This syringe was inserted in a vial so that the tip of the syringe was pointing down in the vial. Water was added to the vial so that the mixture of catalyst ink was covered but below the level of the plunger. This vial was placed in an ultrasonic bath for 4 hours. The ultrasonic bath used was from Fisher Scientific model FS20H, although any ultrasonic bath may be used. Ultrasonic energy was applied to the mixture for 4 hours. This ink was then applied directly to the microporous layer of a 10BB paper electrode from SGL carbon by means of an electronically controlled airbrush. The ink was pumped to the airbrush tip using a syringe pump. The dried ink formed a catalyst layer on the electrode of 3.4 micrometers thick having 0.15 mg $Pt/cm^2$. The exact loading of Pt and thickness of the catalyst layer depends on the amount airbrushed.

Example 14

Commercial phosphomolybdic acid hydrate ($H_3PMo_{12}O_{40}\cdot nH_2O$) (3.66 g) was dissolved in 20 mL of water. Lithium carbonate ($Li_2CO_3$, 0.484 g) was added slowly (each addition should dissolve before more lithium carbonate is added) to phosphomolybdic acid solution with vigorous stirring to bring to a pH of about pH 4.8. The solution turned a yellow-green color. Acetonitrile (60 mL) was added to the solution. A solution of p-aminophenyltrimethoxy silane (0.9026 grams in 15 ml acetonitrile) was added drop-wise, the pH of the resulting solution was adjusted to about a pH 3.3 with 1 M HCl. After stirring for 20 hours at room temperature, the solution was chilled to in an ice-water bath to about 0° C. The diazonium salt of POM $PMo_{11}O_{39}^{7-}$ is prepared by adding the solution prepared in Example 8 drop wise over a 1 minute period. 1 gram of carbon black prepared according to Example 1 was added to 100 ml of de-ionized water, the resulting mixture was heated to reflux; the POM diazonium salt solution was added drop-wise over a period of 30 minutes to the refluxing carbon black solution after the addition was completed the mixture was maintained at 95° C. with stirring, for about 6 hours, placed in an oven-night and brought to dryness. The dry, solid product was washed with hot de-ionized water (200 ml), dried in an oven at 95° C., the dried product was subjected to Soxhlet extraction with ethanol for 6 hours, dried overnight in an oven, rinsed with de-ionized water and oven dried again overnight.

Example 15

50 grams of carbon black was added to 800 ml of concentrated hydrochloric acid, the mixture was heated to reflux and maintained at reflux overnight. The carbon black was collected by means of filtration, added to deionized water, heated to reflux and maintained at reflux overnight. The carbon black was collected by means of filtration and rinsed with deionized water until the filtrate was neutral and dried in an oven at 95° C.

Example 16

To 140 ml of an acetonitrile/water mixture (100 parts water:40 parts acetonitrile) a solution of p-aminophenyltrimethoxy silane (0.521 grams in 10 ml acetonitrile) was added drop-wise, the pH of the resulting solution was adjusted to 1.8 with 1 M HCl. 2.684 grams of Example 6, $[(CH_3)_4N]_4H_3[PMo_{11}O_{39}]\cdot nH_2O$, was slowly added to the silane solution, the pH was monitored and adjusted to 1.8 with 1M HCl as needed. After stirring for 20 hours at room temperature, after which it was chilled to in an ice-water bath to around 0-5° C. The diazonium salt of POM $PMo_{11}O_{39}^{7-}$ is prepared by adding the solution prepared in Example 2 drop wise over a 1 minute period. 1 gram of carbon black prepared according to Example 15 was added to 100 ml of de-ionized water, the resulting mixture was heated to reflux; the POM diazonium salt solution was added drop-wise over a period of 30 minutes to the refluxing carbon black solution after the addition was completed the mixture was maintained at 95° C. with stirring, for 5-6 hours, placed in an oven-night and brought to dryness. The dry, solid product was washed with hot de-ionized water (200 ml), dried in an oven at 95° C., the dried product was subjected to Soxhlet extraction with ethanol for 6 hours, dried overnight in an oven, rinsed with de-ionized water and oven dried again overnight.

Example 17

0.01 grams of platinum black and 0.01 grams of the product prepared in Example 16 are placed in a 5 cc syringe to which is added 1 g of methanol and 0.1 g of 5 wt % NAFION® solution. The syringe was capped and the plunger was inserted. This syringe was inserted in a vial so that the tip of the syringe was pointing down in the vial. Water was added to the vial so that the mixture of catalyst ink was covered but below the level of the plunger. This vial was placed in an ultrasonic bath for 4 hours. The ultrasonic bath used was from Fisher Scientific model FS20H, although any ultrasonic bath may be used. Ultrasonic energy was applied to the mixture for 4 hours. This ink was then applied directly to the microporous layer of a 10BB paper electrode from SGL carbon by means of an electronically controlled airbrush. The ink was pumped to the airbrush tip using a syringe pump. The dried ink formed a catalyst layer on the electrode of 3.4 micrometers thick having 0.15 mg $Pt/cm^2$. The exact loading of Pt and thickness of the catalyst layer depends on the amount airbrushed.

It should be noted that the foregoing detailed description of the invention is only illustrative and that various alternatives and modifications can be devised by those skilled in the appropriate arts pertaining to the various elements contained within the invention. Accordingly, the present invention disclosed herewith is intended to embrace all such alternative, modifications and variances that fall within and the scope of the disclosed invention.

What is claimed is:

1. An immobilized polyoxometalate comprising:
    a polyoxometalate anion;
    a functional entity; and
    a support substance, wherein the polyoxometalate is chemically bonded to the support substance through the functional entity, wherein the polyoxometalate and functional entity are chemically bonded together by one of —O—Si—, —O—P—, —O—Sn—, —O—Ti—, —O—Ge— and —O—Zn—, wherein the chemical bond linking the support substance and functional entity are chemically bonded together by one of —$CH_2$—, —$CHR^1$—, —$CR^1R^2$—, —S—, —NH—, —$NR^1$—, —N=N—, —$CH_2CH_2$—, —C(=O)O—, or —O—, and wherein $R^1$ and/or $R^2$ are alkyl or aryl groups, and wherein $R^1$ and $R^2$ are the same or differ.

2. The immobilized polyoxometalate of claim 1, wherein the polyoxometalate anion further comprises:
    one or more transition metal addenda-elements; and
    one or more hetero-elements selected from one of the IUPAC groups 13, 14, 15, or 16.

3. The immobilized polyoxometalate of claim 2, wherein the one or more transition metal addenda-elements comprise one of vanadium, tantalum, molybdenum, tungsten or a mixture thereof, and wherein the one or more hetero-element comprises phosphorous, silicon or mixture thereof.

4. The immobilized polyoxometalate of claim 2, wherein at least one of the following is true:
    i) the one or more transition metal addenda-elements have an ionic radius from about 0.4 Angstroms to about 0.9 Angstroms;
    ii) the one or more transition metal addenda-elements have ionic charge from about +2 to about +8; and
    iii) the one or more transition metal addenda-element have a $d^0$ or $d^1$ electronic configuration.

5. The immobilized polyoxometalate of claim 1, wherein the support substance comprises one of carbon black, platinum black, metallic black, platinum alloy black, or mixtures thereof.

6. The immobilized polyoxometalate of claim 1, wherein the functional entity comprises one of a silane, phosphate, phosphate ester, phosphonate, phosphonate ester, phosphinate, phosphinate ester, phosphonite, phosphinite, phosphine, tin-containing entity, germanium-containing entity, titanium-containing entity, zinc-containing entity, or a mixture thereof.

7. The immobilized polyoxometalate of claim 6, wherein one or more functional entities are chemically bonded to the polyoxometalate anion.

8. The immobilized polyoxometalate of claim 1, wherein the polyoxometalate anion comprises from at least about 0.5 weight % to at most about 90 weight % of the immobilized polyoxometalate, wherein the support substance comprises from at least about 10 weight % to at most about 99 weight % of the immobilized polyoxometalate, wherein the support substance comprises a plurality of particles having an average diameter from about 1 nm to about 100 nm.

9. The immobilized polyoxometalate of claim 8, wherein one or more of the polyoxometalate anions have one or more functional entities chemical bonded thereto, wherein the one or more functional entities are chemically bonded to the plurality of the particles.

10. An immobilized polyoxometalate, comprising:
    a functional entity having first and second reactive entities;
    a polyoxometalate anion containing a transition metal addenda-element, wherein the first reactive entity is chemically bonded to the polyoxometalate anion, wherein the first reactive entity is selected from the group consisting of —O—Si—, —O—P—, —O—Sn—, —O—Ti—, —O—Ge— and —O—Zn—; and
    a support substance, wherein the second reactive entity is chemically bonded to the support substrate, wherein the polyoxometalate anion is chemically bonded to the support by the functional entity, wherein the second reactive entity is selected from the group consisting of —$CH_2$—, —$CHR^1$—, —$CR^1R^2$—, —S—, —NH—, —$NR^1$—, —N=N—, —$CH_2CH_2$—, —C(=O)O—, or —O—, and wherein $R^1$ and/or $R^2$ are alkyl or aryl groups, and wherein $R^1$ and $R^2$ are the same or differ.

11. The immobilized polyoxometalate of claim 10, wherein the polyoxometalate anion comprises one or more transition metal addenda-elements, and wherein the polyoxometalate anion further comprises at least one hetero-element.

12. The immobilized polyoxometalate of claim 11, wherein the at least one hetero-element comprises one or more elements from the IUPAC groups 13, 14, 15, 16 or combination thereof.

13. The immobilized polyoxometalate of claim 10, wherein the transition metal is one of vanadium, tantalum, molybdenum, or tungsten.

14. The immobilized polyoxometalate of claim 11, wherein the at least one hetero-element comprises phosphorous, silicon or a combination thereof.

15. The immobilized polyoxometalate of claim 10, wherein the transition metal has one of the following:
   (i) an ionic radius, wherein the ionic radius ranges from about 0.4 Angstroms to about 0.9 Angstroms;
   (ii) an ionic charge from about +2 to about +8; and
   (iii) a $d^0$ or $d^1$ electronic configuration.

16. The immobilized polyoxometalate of claim 10, wherein the support substance comprises one of carbon black, platinum black, metallic black, platinum alloy black, or mixtures thereof.

17. The immobilized polyoxometalate of claim 10, wherein the functional entity comprises one of a silane, phosphate or phosphate ester, phosphonate or phosphonate ester, phosphinate or phosphinate ester, phosphonite, phosphinite, phosphine, tin-containing entity, germanium-containing entity, titanium-containing entity, zinc-containing entity, or mixture thereof.

18. The immobilized polyoxometalate of claim 10, wherein one or more functional entities are chemically bonded to the polyoxometalate anion, wherein the polyoxometalate anion comprises from at least 0.5 weight % to at most about 90 weight % of the immobilized polyoxometalate, wherein the support substance comprises from at least about 10 weight % to at most about 99 weight % of the immobilized polyoxometalate, wherein the support substance comprises a plurality of particles having an average diameter from about 1 nm to about 100 nm, wherein one or more of the polyoxometalates have one or more functional entities chemical bonded thereto, and wherein the one or more functional entities are chemically bonded to the plurality of the particles.

19. An immobilized polyoxometalate, comprising:
   a functional entity having first and second reactive entities;
   a polyoxometalate anion containing a transition metal addenda-element, wherein the first reactive entity is chemically bonded to the polyoxometalate anion by one of —O—Si—, —O—P—, —O—Sn—, —O—Ti—, —O—Ge— and —O—Zn—; and
   a support substance, wherein the support substance comprises one of carbon black, platinum black, metallic black, platinum alloy black, or mixtures thereof, wherein the second reactive entity is chemically bonded to the support substrate by one of —$CH_2$—, —$CHR^1$—, —$CR^1R^2$—, —S—, —NH—, —$NR^1$—, —N=N—, —$CH_2CH_2$—, —C(=O)O—, or —O—, wherein the polyoxometalate anion is chemically bonded to the support by the functional entity.

20. The immobilized polyoxometalate of claim 19, wherein the polyoxometalate anion comprises one or more transition metal addenda-elements, and wherein the polyoxometalate anion further comprises a hetero-element selected from IUPAC group 13, 14, 15 or 16.

21. The immobilized polyoxometalate of claim 20, wherein the transition metal is one of vanadium, tantalum, molybdenum, or tungsten and wherein the hetero-element comprises phosphorous or silicon.

22. The immobilized polyoxometalate of claim 19, wherein the functional entity comprises one of a silane, phosphate or phosphate ester, phosphonate, phosphonate ester, phosphinate, phosphinate ester, phosphonite, phosphinite, phosphine, tin-containing entity, germanium-containing entity, titanium-containing entity, zinc-containing entity, or mixture thereof and wherein $R^1$ and/or $R^2$ are alkyl or aryl groups, and wherein $R^1$ and $R^2$ are the same or differ.

23. The immobilized polyoxometalate of claim 19, wherein the polyoxometalate anion comprises from at least about 0.5 weight % to at most about 90 weight % of the immobilized polyoxometalate, wherein the support substance comprises from at least about 10 weight % to at most about 99 weight % of the immobilized polyoxometalate, wherein the support substance comprises a plurality of particles having an average diameter from about 1 nm to about 100 nm, wherein one or more of the polyoxometalates having one or more functional entities chemical bonded thereto, and wherein the one or more functional entities are chemically bonded to the plurality of the particles.

* * * * *